(12) United States Patent
Lei et al.

(10) Patent No.: US 10,827,199 B2
(45) Date of Patent: Nov. 3, 2020

(54) ENCODING DEVICE, ENCODING METHOD, AND COMPUTER-READABLE RECORDING MEDIUM STORING ENCODING PROGRAM

(71) Applicant: FUJITSU LIMITED, Kawasaki-shi, Kanagawa (JP)

(72) Inventors: Xuying Lei, Kawasaki (JP); Hidenobu Miyoshi, Kawasaki (JP); Kimihiko Kazui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/380,011

(22) Filed: Apr. 10, 2019

(65) Prior Publication Data

US 2019/0335204 A1 Oct. 31, 2019

(30) Foreign Application Priority Data

Apr. 27, 2018 (JP) .................................. 2018-086224

(51) Int. Cl.
*H04N 19/105* (2014.01)
*H04N 19/573* (2014.01)
(Continued)

(52) U.S. Cl.
CPC .......... *H04N 19/63* (2014.11); *H04N 19/117* (2014.11); *H04N 19/14* (2014.11); *H04N 19/513* (2014.11)

(58) Field of Classification Search
CPC .. H04N 19/152; H04N 19/172; H04N 19/105; H04N 19/63; H04N 19/117; H04N 19/14; H04N 19/513; G06K 9/00765
(Continued)

(56) References Cited

U.S. PATENT DOCUMENTS

2004/0057523 A1 3/2004 Koto et al.
2007/0171971 A1 7/2007 Francois et al.
(Continued)

FOREIGN PATENT DOCUMENTS

JP 2000-228770 A 8/2000
JP 2007-060695 A 3/2007
JP 2007-535834 A 12/2007

OTHER PUBLICATIONS

"Video Coding, Audio Coding, and Multiplexing Specifications for Digital Broadcasting, ARIB Standard", Association of Radio Industries and Businesses, ARIB STD-B32 Version 3.9-E1, pp. 1-585, Dec. 2016 (Total 419 pages).
(Continued)

*Primary Examiner* — Albert Kir
(74) *Attorney, Agent, or Firm* — Fujitsu Patent Center

(57) ABSTRACT

An apparatus includes: a processor configured to: execute temporal-scalable coding on input-video-image data at a first frame rate; convert the input-video-image data to video-image data of a second frame rate lower than the first frame rate; execute temporal-scalable coding on the video-image data of the second frame-rate and output a second encoding-complexity measure of a picture subjected to the temporal-scalable coding at the second frame-rate; correct, when the temporal-scalable coding is executed on the input-video-image data at the first frame-rate, a first encoding-complexity measure, estimated based on the second encoding-complexity of the picture and to be referenced for a picture to be encoded, of the picture to be encoded, based on a distance between the picture to be encoded and the picture to be referenced in a time direction; and execute the temporal-scalable coding on the input-video-image data at the first frame-rate based on the corrected first encoding-complexity measure.

16 Claims, 13 Drawing Sheets

(51) Int. Cl.
*H04N 19/14* (2014.01)
*H04N 19/117* (2014.01)
*H04N 19/63* (2014.01)
*H04N 19/513* (2014.01)

(58) Field of Classification Search
USPC .......... 375/240.02, 240.03, 240.26; 348/700
See application file for complete search history.

(56) References Cited

U.S. PATENT DOCUMENTS

| | | | | |
|---|---|---|---|---|
| 2009/0040390 A1* | 2/2009 | Morita | ............... | G06K 9/00765 |
| | | | | 348/700 |
| 2013/0272383 A1* | 10/2013 | Xu | ....................... | H04N 19/172 |
| | | | | 375/240.03 |
| 2015/0281709 A1* | 10/2015 | Bracha | ................. | H04N 19/152 |
| | | | | 375/240.26 |

OTHER PUBLICATIONS

"10 Rate Control and Quantization Control", Internet http://www.mpeg.org/MPEG/MSSG/tm5/Ch10/Ch10.html Retrieved on Aug. 13, 2008 (Total 3 pages).

* cited by examiner

FIG. 4

|  | PRECEDING DISTANCE | SUCCEEDING DISTANCE |
|---|---|---|
| B1 | 1 | 15 |
| B3 | 3 | 5 |
| B5 | 1 | 3 |
| B7 | 3 | 1 |
| B9 | 1 | 7 |
| B11 | 3 | 1 |
| B13 | 1 | 3 |
| B15 | 1 | 1 |

FIG. 5A

TID6

| B1 | B3 | B5 | B7 | B9 | B11 | B13 | B15 |
|----|----|----|----|----|----|----|----|
| ① | ③ | ① | ① | ① | ① | ③ | ① |

MINIMUM REFERENCE DISTANCE

| 1 | 3 | 1 | 1 | 1 | 1 | 3 | 1 |

EXAMPLE OF CORRECTION COEFFICIENTS

FIG. 5B

| 57k | 549k | 28k | 22k | 27k | 41k | 51k | 22k |
|-----|------|-----|-----|-----|-----|-----|-----|
| B1 | B3 | B5 | B7 | B9 | B11 | B13 | B15 |

EXAMPLE OF AMOUNTS OF GENERATED INFORMATION
PREVIOUS SOP

| 3 | 25 | 1 | 1 | 1 | 2 | 2.5 | 1 |
|---|----|---|---|---|---|-----|---|
| B1 | B3 | B5 | B7 | B9 | B11 | B13 | B15 |

EXAMPLE OF CORRECTION COEFFICIENTS
CURRENT SOP

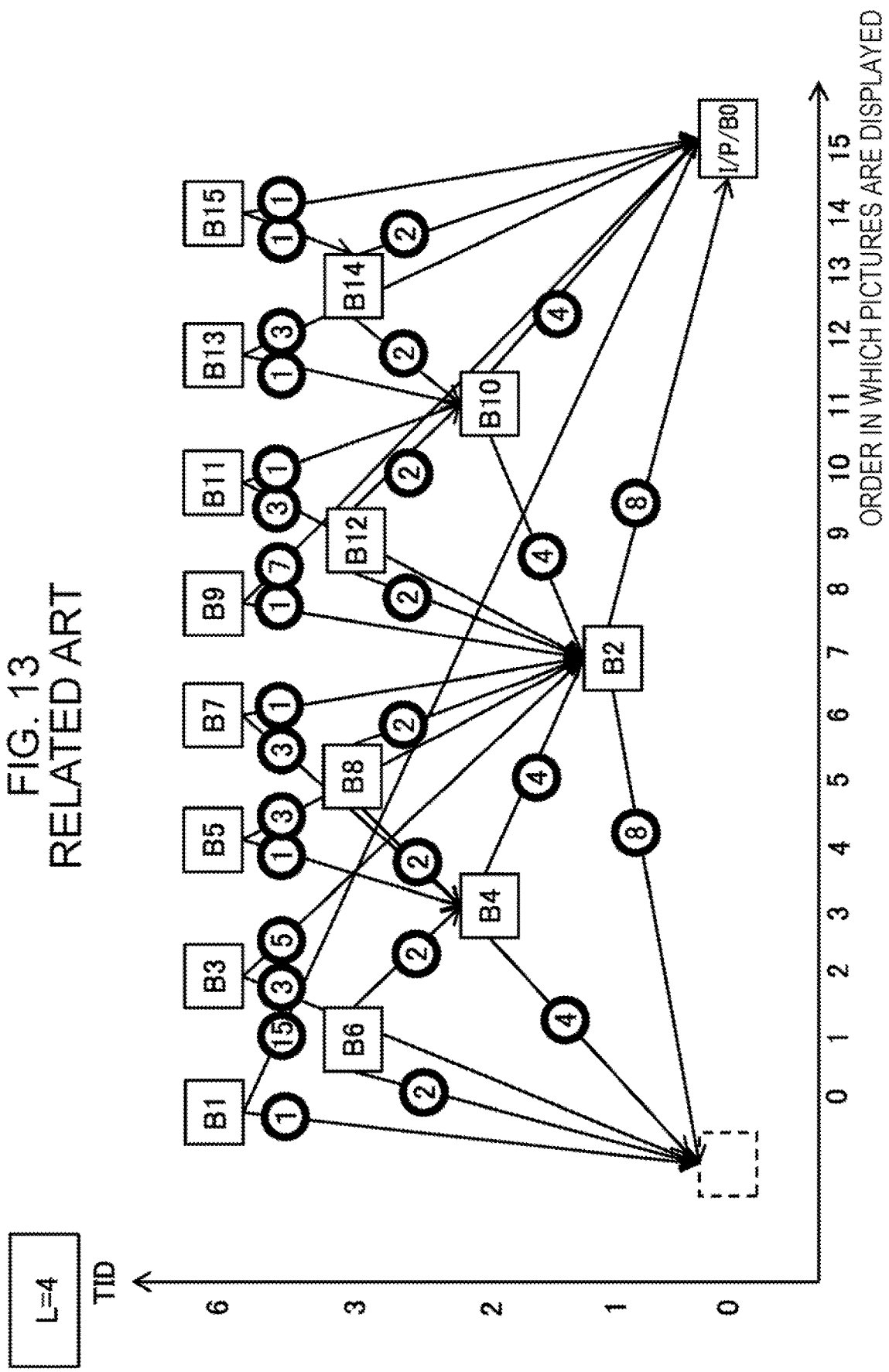

ENCODING DEVICE, ENCODING METHOD, AND COMPUTER-READABLE RECORDING MEDIUM STORING ENCODING PROGRAM

CROSS-REFERENCE TO RELATED APPLICATION

This application is based upon and claims the benefit of priority of the prior Japanese Patent Application No. 2018-86224, filed on Apr. 27, 2018, the entire contents of which are incorporated herein by reference.

FIELD

The embodiments discussed herein are related to an encoding device, an encoding method, and a computer-readable recording medium storing an encoding program.

BACKGROUND

Currently, products, which are video cameras, digital versatile disc (DVD) recorders, and the like and use a technique for compressing and encoding an image have been widely distributed. In a field related to image compression and encoding, a next-generation compression and encoding technique has been actively discussed to improve the efficiency of compression and encoding and improve the qualities of images.

Regarding compression and encoding techniques, there is H.265/MPEG-H High Efficiency Video Coding (HEVC) (hereinafter referred to as "HEVC" in some cases) as standards defined by International Organization for Standardization/International Electrotechnical Commission (ISO/IEC), for example.

In HEVC, encoding schemes for 4K (=3840×2160 pixels) images and 8K (=7680×4320 pixels) images are standardized. The HEVC standards are defined as ARIB STD-B32 by Association of Radio Industries and Businesses (ARIB).

In HEVC, a bidirectionally predictive picture (B picture) is used as a picture to be referenced, and encoding is executed on a hierarchical structure in a time axis direction (or a time direction or time scalability).

FIG. 12 is a diagram illustrating an example of a structure of pictures (SOP) subjected to temporal scalable coding defined in ARIB STD-B32. The example illustrated in FIG. 12 indicates a 120 Hz progressive scheme (120 Hz/p) (hereinafter also referred to as "120 p"). When temporal scalable coding introduced in HEVC is executed, the SOP is a unit in which the order in which access units (AUs) are encoded and reference relationships are described. In the example illustrated in FIG. 12, 16 pictures form the single SOP.

In FIG. 12, the ordinate indicates a temporary identification (TID) and the abscissa indicates the order in which pictures are displayed. In addition, "I" indicates an intra-picture (I picture), "P" indicates a predictive picture (P picture), and "B" indicates a B picture. Indices added to B pictures indicate the order in which the B pictures are encoded (or decoded). For example, "B1" indicates a B picture to be encoded first (or indicates a B picture to be encoded second when "B0" indicates a B picture to be encoded first).

As illustrated in FIG. 12, for example, 2 arrows extend from a "B3" picture to an "I" (or "P" or "B0") picture and a "B2" picture. The arrows indicate that the "B3" picture is encoded by referencing the "I" (or "P" or "B0") picture or the "B2" picture. Similarly, a "B5" picture is encoded by referencing a "B4" picture or the "B2" picture.

In FIG. 12, a decoding device decodes pictures surrounded by a dotted line and belonging to TIDs=0 to 3 among the 16 pictures to reproduce 60 frames per second in a 60 Hz progressive scheme (60 Hz/P) (hereinafter also referred to as "60 p"). In FIG. 12, the decoding device decodes all the pictures belonging to the TIDs=0 to 3 and a TID=6 to reproduce 120 frames per second in the progressive scheme (120 p). An encoding device transmits all the 16 pictures as a single 120 p bitstream to a multiplexing device. The multiplexing device separates the 120 p bitstream into a 60 p sub-bitstream conforming to the ARIB standard and a remaining 120 p subset and transfers the 60 p sub-bitstream and the 120 p subset. By transmitting the 120 p bitstream to the decoding device, the decoding device may obtain a 120 p reproducible image and a 60 p reproducible image.

The temporal scalable coding has an advantage of transmitting video image data of two different frame rates of 120 p and 60 p.

The encoding device may execute rate control. For example, even when the encoding device is constrained due to a bandwidth of a communication path, writing to a memory, or the like, the encoding device may transmit a bitstream at a fixed bit rate by executing the rate control.

As an example of the rate control, there is MPEG-2 Test Model 5 (hereinafter also referred to as "TM5"). TM5 is one of schemes of executing the rate control in feedback control. In TM5, in step 1, global complexity measures (GCMs) (hereinafter also referred to as "encoding complexity measures" or "GCMs") are calculated and target information amounts for pictures are calculated based on the encoding complexity measures. In TM 5, in steps 2 and 3, quantization parameters for remaining pictures included in a group of pictures (GOP) and the like are determined based on the target information amounts, and encoding is executed. The GCMs are calculated according to the following Equation.

$$X_i = S_i Q_i \quad (1)$$

$$X_p = S_p Q_p \quad (2)$$

$$X_b = S_b Q_b \quad (3)$$

In Equations (1) to (3), $X_i$, $X_p$, and $X_b$ indicate GCMs of I, P, and B pictures. $S_i$, $S_p$, and $S_b$ indicate bit amounts (hereinafter also referred to as "amounts of generated information"), generated upon the encoding of the I, P, and B pictures. $Q_i$, $Q_p$, and $Q_b$ indicate average quantization parameters, calculated by averaging actual quantization values, of the I, P, and B pictures.

As a technique related to compression and encoding, there is the following technique. There is a variable rate video image encoding method of calculating an encoding complexity measure for each timeslot from statistical data obtained by first encoding, executing optimal bit allocation using the encoding complexity measures, and executing second encoding on a video image sequence based on the results of the optimal bit allocation.

According to this technique, even when an operation of editing a video image sequence in a time direction is executed after the first encoding, the second encoding may be efficiently executed without the re-execution of the first encoding to reduce the total number of times of the encoding.

In addition, there is an encoding method in which the complexity of an interpolation filter used with resolution selected for the use of motion compensation during an operation of motion compensation filtering depends on a space and time resolution, a bit rate, a time resolution level, or a combination thereof.

According to this technique, it may be possible to inhibit a reduction in the quality of an image when the resolution of the image is smaller than the size of an interpolation filter used for motion compensation.

In addition, there is a video image encoding method for extracting a reference macroblock from multiple frames to be referenced and generating a predictive macroblock image by linear extrapolation or linear interpolation based on a distance between a frame to be referenced and a frame to be encoded.

According to this technique, regarding a faded image that may not be appropriately encoded by a related-art video image encoding method such as MPEG, an increase in overhead of encoded data may be suppressed and the efficiency of prediction may be significantly improved.

Examples of related art are ARIB STD-B32 Version 3.9 (amended on Dec. 9, 2016) and Test Mode 5, http://www.mpeg.org/MPEG/MSSG/tm5/.

Examples of related art are Japanese Laid-open Patent Publication No. 2000-228770, Japanese National Publication of International Patent Application No. 2007-535834, and Japanese Laid-open Patent Publication No. 2007-60695.

SUMMARY

According to an aspect of the embodiments, an apparatus includes a processor configured to: execute temporal scalable coding on input video image data at a first frame rate; convert the input video image data to video image data of a second frame rate lower than the first frame rate; execute temporal scalable coding on the video image data of the second frame rate and output a second encoding complexity measure of a picture subjected to the temporal scalable coding at the second frame rate; correct, when the temporal scalable coding is executed on the input video image data at the first frame rate, a first encoding complexity measure, estimated based on the second encoding complexity of the picture and to be referenced for a picture to be encoded, of the picture to be encoded, based on a distance between the picture to be encoded and the picture to be referenced in a time direction; and execute the temporal scalable coding on the input video image data at the first frame rate based on the corrected first encoding complexity measure.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of distances between pictures belonging to a TID=6 and pictures to be referenced in a time direction;

FIGS. 5A and 5B are diagrams illustrating examples of set correction coefficients;

FIG. 13 is a diagram illustrating an example of distances between pictures and pictures to be referenced.

DESCRIPTION OF EMBODIMENTS

Figure 1:
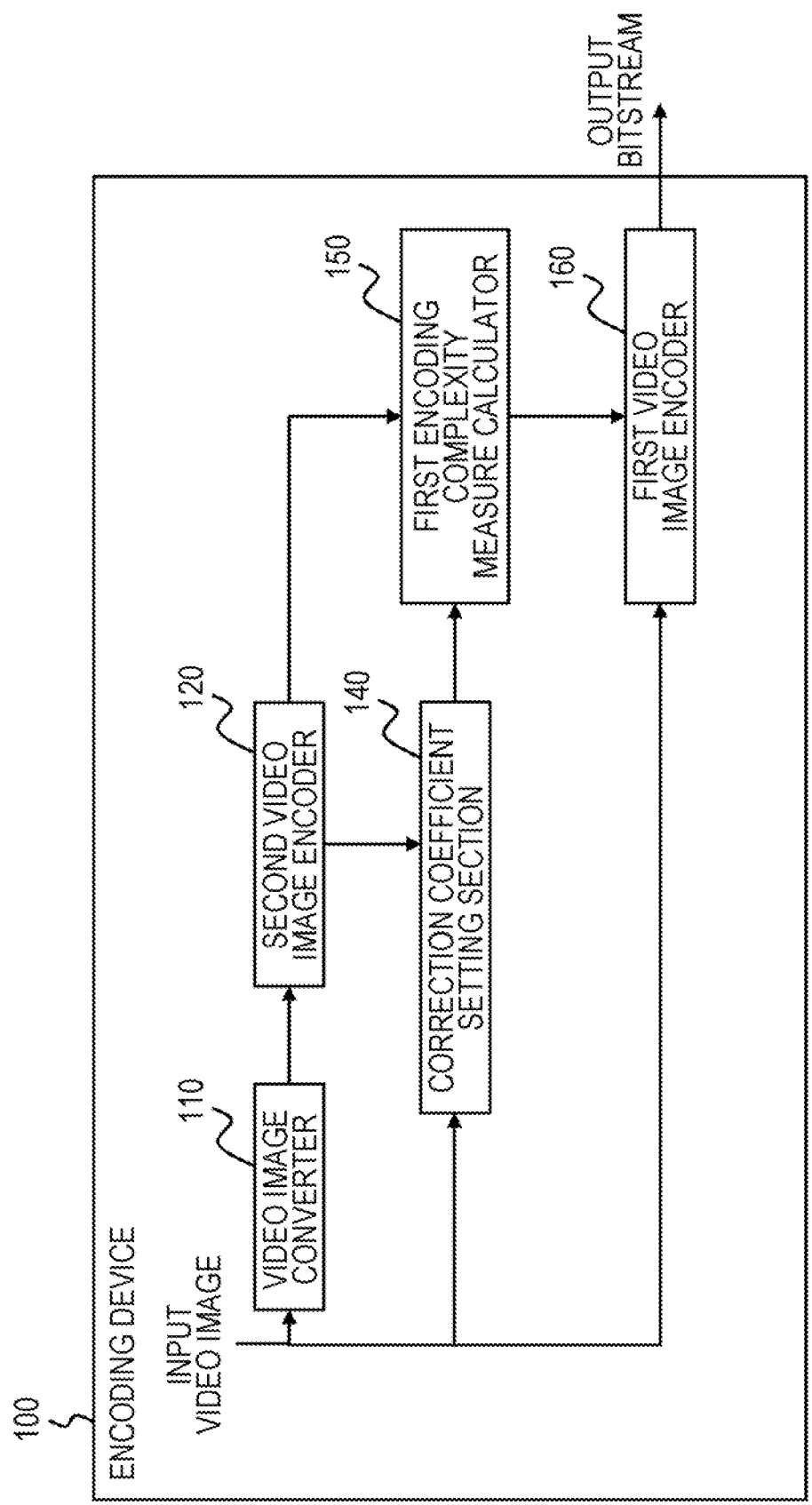
FIG. 1 is a diagram illustrating an example of a configuration of an encoding device.

When attention is paid to Equations (1) to (3), GCMs of pictures are proportional to amounts of generated information.

FIG. 13 is a diagram illustrating distances between pictures and pictures to be referenced in a time direction in an SOP to be subjected to temporal scalable coding defined by ARIB. For example, when a "B2" picture is to be encoded by referencing a previous I (or P or "B0") picture in the SOP, a distance between the "B2" picture and the I picture is "8". When the I picture, the P picture, or the "B0" picture is referenced in the same SOP, the distance between the "B2" picture and the I, P, or "B0" picture is "8".

In FIG. 13, for example, when attention is paid to a TID=2, a "B4" picture is to be encoded by referencing an I (or P or "B0") picture or referencing a "B2" picture, the distance between the "B4" picture and the picture to be referenced in the time direction is "4". A distance between a "B10" picture and a picture to be referenced in the time direction is "4". The distances between the two B pictures "B4" and "B10" belonging to the TID=2 and the pictures to be referenced are "4" and are the same.

For example, when attention is paid to a TID=3, distances between four pictures "B6", "B8", "B12", and "B14" and pictures to be referenced in the time direction are "2".

In FIG. 13, distances between pictures belonging to a TID=0 and pictures to be referenced in the time direction are the same, distances between pictures belonging to a TID=1 and pictures to be referenced in the time direction are the same, distances between pictures belonging to the TID=2 and pictures to be referenced in the time direction are the same, and distances between pictures belonging to the TID=3 and pictures to be referenced in the time direction are the same.

Since distances between pictures belonging to the same TID among the TIDs=0 to 3 and pictures to be referenced in the time direction are the same, amounts of information generated upon the encoding of the pictures belonging to the same TID are in a fixed range. For example, since the distances between the pictures belonging to the TID=3 and pictures to be referenced are "2", amounts of information generated when the pictures belonging to the TID=3 are encoded based on the pictures to be referenced are in a fixed range.

However, distances between the pictures belonging to a TID=6 and pictures to be referenced in the time direction may vary depending on the pictures to be referenced. For example, a distance between a "B1" picture and a picture to be referenced in the time direction is "1" or "15", and a distance between a "B3" picture and a picture to be referenced in the time direction is "3" or "5".

In this case, for example, when the "B1" picture is to be encoded by referencing the I (or P or "B0") picture succeeding the "B1" picture by 15 pictures, a distance between the "B1" picture and the picture to be referenced in the time direction is longer than the distance "3" or "5" between the "B3" picture and a picture to be referenced in the time direction. Thus, in this case, the amount of information generated upon the encoding of the "B1" picture may be larger than the amount of information generated upon the encoding of the "B3" picture. Amounts of information generated upon the encoding of the other pictures belonging to the TID=6 may significantly vary depending on pictures to be referenced, compared with the pictures other than the pictures belonging to the TID=6.

As indicated by Equations (1) to (3), GCMs of pictures are proportional to amounts of information generated upon the encoding of the pictures. Thus, since amounts of information generated upon the encoding of pictures belonging to each of the TIDs=0 to 3 are in a fixed range, GCMs of the pictures belonging to each of the TIDs=0 to 3 may be in a fixed range. Since amounts of information generated upon the encoding of the pictures belonging to the TID=6 may not be in a fixed range, GCMs of the pictures belonging to the TID=6 may not be in a fixed range.

In the rate control of TM5, after GCMs are calculated and amounts of generated information are calculated, actual encoding is executed, for example. As described above, the amounts of information generated upon the encoding of the pictures belonging to the TID=6 may significantly vary. In this case, the amount of information generated upon the encoding of a picture may be larger than a target information amount for the picture. In this case, the rate control may not be appropriately executed and the quality of an image may be reduced due to a limit of a bandwidth of a communication path.

Hereinafter, embodiments are described with reference to accompanying drawings. Challenges and the embodiments that are described in this specification are an example and do not limit claims. The embodiments may be combined without contradiction of details of processes. Terms and technical details described in standards written as standards related to image compression and encoding may be used instead of terms and details used in this specification.

First Embodiment

Example of Configuration of Encoding Device

FIG. 1 is a diagram illustrating an example of a configuration of an encoding device 100 according to a first embodiment.

For example, the encoding device 100 executes a compression and encoding process on input video image data in accordance with the provisions of HEVC. For example, the encoding device 100 executes temporal scalable coding defined in ARIB STD-B32 or the like.

As described above, for example, the temporal scalable coding is executed on a hierarchical structure using a B picture as a picture to be referenced. The encoding device 100 executes the temporal scalable coding, thereby outputting a 120 p bitstream to a multiplexing device. The multiplexing device separates the single 120 p bitstream into a 60 p sub-bitstream and a 120 p subset in accordance with the ARIB standard and transmits the 60 p sub-bitstream and the 120 p subset.

Figure 12:
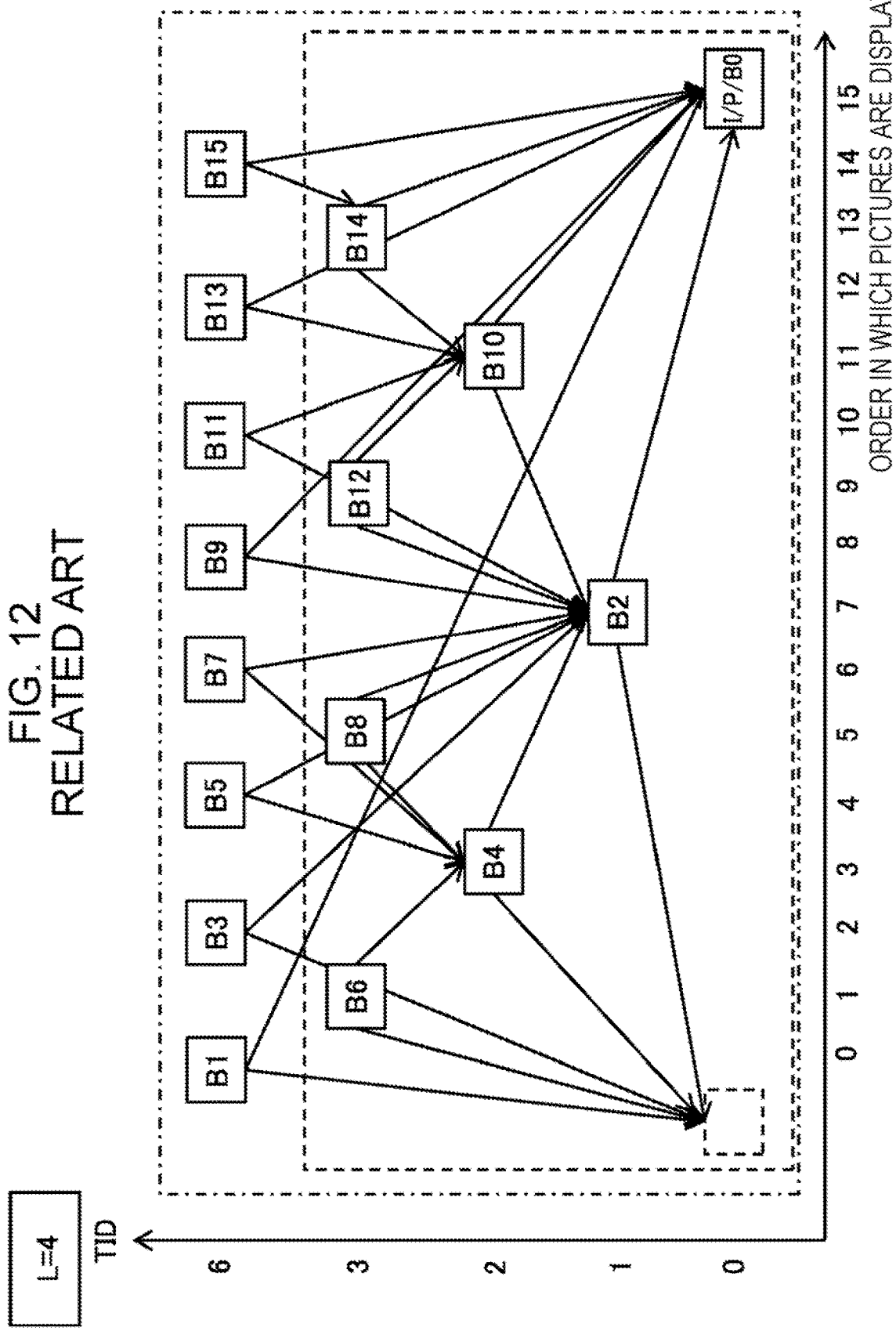
FIG. 12 is a diagram illustrating an example of an SOP.

In the example illustrated in FIG. 12, encoded data of pictures ("B1", "B3", "B5", "B7", "B9", "B11", "B13", and "B15") belonging to a TID=6 is included in the 120 p subset, and encoded data of pictures ("I", "P", "B0", "B2", "B4", "B6", "B8", "B10", "B12", and "B14") belonging to TIDs=0 to 3 is included in the 60 p sub-bitstream.

The 8 B pictures belonging to the TID=6 are referred to as 120 p subset in some cases. The 8 B pictures belonging to the TID=0 to 3, the I picture, and the P picture are referred to as 60 p subset in some cases.

A decoding device receives the bitstream and collectively decodes the encoded data of the 120 p subset and the encoded data of the 60 p sub-bitstream to obtain a 120 p reproducible image, for example. The decoding device may decode the encoded data of the 60 p sub-bitstream to obtain a 60 p reproducible image without decoding the encoded data of the 120 p subset, for example.

In the first embodiment, the multiplexing device may not be installed. In this case, the encoding device 100 may generate a single 120 p stream including the two sub-streams and transmit the generated 120 p stream to the decoding device.

120 p indicates that 120 frames are reproduced per second, for example. 60 p indicates that 60 frames are reproduced per second, for example. In the first embodiment, an example of a video image input to the encoding device 100 is an 8K 120 p video image.

A target image that has yet to be subjected to encoding is referred to as frame in some cases. A target image subjected to encoding is referred to as picture in some cases. In the following description, a frame and a picture are not distinguished from each other in some cases.

The encoding device 100 includes a video image converter 110, a second video image encoder 120, a correction coefficient setting section 140, a first encoding complexity measure calculator 150, and a first video image encoder 160.

The video image converter 110 converts 8K 120 p video image data to 4K 60 p video image data. For example, the video image converter 110 decimates 8K 120 p frames to generate 8K 60 p video image data and decimates pixels of 8K 60 p frames to reduce the data to 4K data and generate 4K 60 p video image data.

The second video image encoder 120 executes hierarchical encoding on the 4K 60 p video image data output by the video image converter 110. Then, the second video image encoder 120 outputs motion information calculated in the hierarchical encoding process to the correction coefficient setting section 140. In addition, the second video image encoder 120 calculates 4K 60 p GCMs (hereinafter also referred to as "$GCM_{60p}$") and outputs the $GCM_{60p}$ to the first encoding complexity measure calculator 150. Details of the second video image encoder 120 are described later.

The correction coefficient setting section 140 receives the 8K 120 p input video image data. Then, the correction coefficient setting section 140 calculates correction coefficients r based on distances between pictures to be encoded and pictures to be referenced in the time direction. In this case, the correction coefficient setting section 140 may calculate the correction coefficients r based on information on motion vectors. Details of the correction coefficient setting section 140 are described later. Hereinafter, "setting" and "calculating" are not distinguished from each other in some cases.

The first encoding complexity measure calculator 150 calculates 8K 120 p GCMs (hereinafter also referred to as "$GCM_{120p}$") based on the $GCM_{60p}$ output by the second video image encoder 120 and the correction coefficients r output by the correction coefficient setting section 140.

The first encoding complexity measure calculator 150 calculates a target information amount for each of the pictures belonging to the TIDs=0 to 3 based on the $GCM_{60p}$. The first encoding complexity measure calculator 150 calculates a target information amount for each of the pictures belonging to the TID=6 based on the $GCM_{120p}$. Details of the calculation of the correction coefficients r and the target information amounts are described in an example of operations.

The first video image encoder 160 executes scalable coding on the 8K 120 p input video image data based on the target information amounts output by the first encoding complexity measure calculator 150. For example, the target information amounts of the pictures belonging to the TID=6 are calculated based on the $GCM_{120p}$. Thus, the first video image encoder 160 may execute the scalable coding based on the $GCM_{120p}$. The first video image encoder 160 synthesizes encoded data of the 120 p subset generated by the scalable coding and encoded data of the 60 p sub-bitstream generated by the scalable coding into a single bitstream and outputs the single bitstream to, for example, the decoding device.

Example of Configurations of First and Second Video Image Encoders

Figure 2:
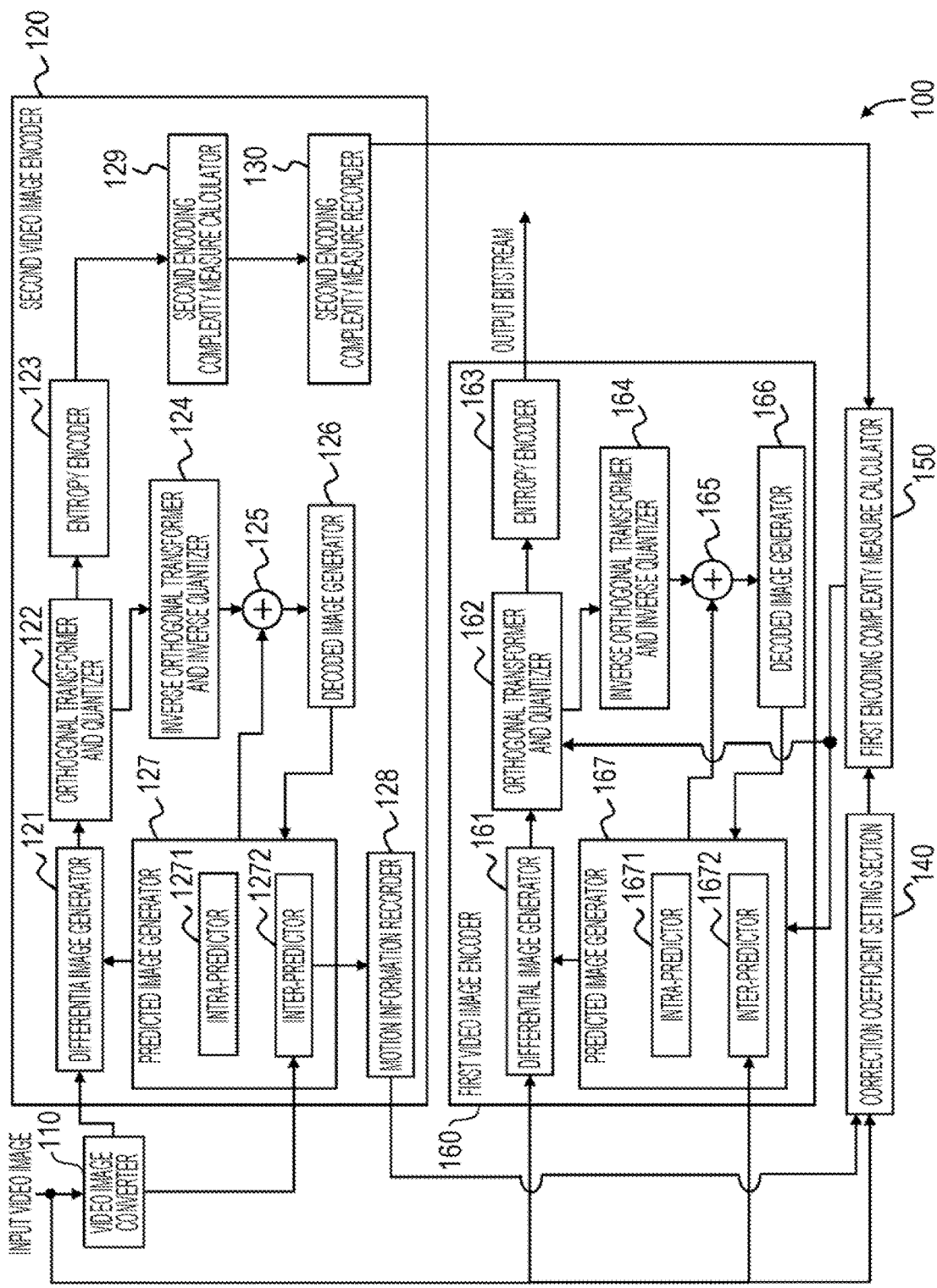
FIG. 2 is a diagram illustrating an example of a configuration of the encoding device.

FIG. 2 is a diagram illustrating an example of a configuration of the encoding device 100 including exemplary configurations of the first and second video image encoders 160 and 120.

The second video image encoder 120 includes a differential image generator 121, an orthogonal transformer and quantizer 122, an entropy encoder 123, an inverse orthogonal transformer and inverse quantizer 124, an adder 125, a decoded image generator 126, a predicted image generator 127, and a motion information recorder 128. The second video image encoder 120 includes a second encoding complexity measure calculator 129 and a second encoding complexity measure recorder 130. The predicted image generator 127 includes an intra-predictor 1271 and an inter-predictor 1272.

The differential image generator 121 subtracts the 4K 60 p video image data output by the video image converter 110 from video image data of a predicted image output by the intra-predictor 1271 to generate video image data of a differential image. The video image data of the differential image is used as video image data of an intra-frame predicted image for intra-prediction encoding to be executed on the 4K 60 p video image data.

The differential image generator 121 subtracts the 4K 60 p video image data output by the video image converter 110 from video image data of a predicted image output by the inter-predictor 1272 to generate video image data of a differential image. The video image data of the differential image is used as video image data of an inter-frame predicted image for inter-prediction encoding to be executed on the 4K 60 p video image data.

The orthogonal transformer and quantizer 122 executes orthogonal transform on the video image data of the intra-frame predicted image or the video image data of the inter-frame predicted image to a frequency region using discrete cosine transform (DCT) or the like. Then, the orthogonal transformer and quantizer 122 calculates a quantization value obtained by rounding the result of dividing a component after the orthogonal transform by a quantization step. The orthogonal transformer and quantizer 122 outputs the calculated quantization value as a transform coefficient to the entropy encoder 123 and the inverse orthogonal transformer and inverse quantizer 124.

The entropy encoder 123 executes, on the transform coefficient, variable length coding (VLC) that is based on Huffman coding. The entropy encoder 123 outputs, as video image data of the I picture, the transform coefficient that corresponds to the intra-frame predicted image and is after the variable length coding. The entropy encoder 123 outputs, as video image data of a P or B picture, the transform coefficient that corresponds to the inter-frame predicted image and is after the variable length coding.

The inverse orthogonal transformer and inverse quantizer 124 multiplies the quantization step used by the orthogonal transformer and quantizer 122 by the transform coefficient to calculate an orthogonal component of video image data before the calculation of the quantization value. Then, the inverse orthogonal transformer and inverse quantizer 124 uses, for example, a predetermined equation to execute inverse DCT transform on the orthogonal component and calculate video image data before the orthogonal transform. The inverse orthogonal transformer and inverse quantizer 124 may read the predetermined equation stored in, for example, an internal memory, substitute the orthogonal component into the equation, and execute the inverse DCT transform.

The adder 125 sums the video image data output by the inverse orthogonal transformer and inverse quantizer 124 and video image data of a predicted image output by the predicted image generator 127 and outputs the result of the summing.

The decoded image generator 126 executes a process of adaptively smoothing video image data included in the video image data output by the adder 125 and indicating a boundary between predetermined blocks based on the intra-frame predicted image or the inter-frame predicted image and generates video image data of a decoded image. The decoded image generator 126 stores the generated video image data of the decoded image in an internal frame memory or reads video image data stored in the frame memory and outputs the read video image data to the predicted image generator 127.

The intra-predictor 1271 generates video image data of a predicted image by executing interpolation with blocks in the vicinity of a predetermined block on video image data in the predetermined block included in a decoded image corresponding to an intra-frame predicted image output by the decoded image generator 126. The predetermined block may be a coding tree unit (CTU) defined in HEVC or a coding unit (CU) obtained by dividing the CTU. The intra-predictor 1271 outputs the generated video image data of the predicted image to the differential image generator 121.

The inter-predictor 1272 detects a motion vector based on the 4K 60 p video image data output by the video image converter 110 and video image data of the inter-frame predicted image output by the decoded image generator 126. Then, the inter-predictor 1272 generates video image data of a predicted image (or a picture to be referenced) shifted for the detected motion vector with respect to video image data of a decoded image corresponding to an inter-frame predicted image output by the decoded image generator 126. In this case, for example, the inter-predictor 1272 references the pictures belonging to the TIDs=0 to 3 and 6 based on an SOP (refer to, for example, FIG. 12) subjected to hierarchical prediction encoding and generates the predicted image. The inter-predictor 1272 outputs video image data of the generated predicted image to the differential image generator 121.

The motion information recorder 128 stores information on the motion vector output by the inter-predictor 1272. The motion information recorder 128 is, for example, a memory.

The second encoding complexity measure calculator 129 calculates the $GCM_{60p}$ based on, for example, amounts of encoded data output by the entropy encoder 123. The second encoding complexity measure calculator 129 uses, for example, Equations (1) to (3) to calculate the $GCM_{60p}$ for each of the pictures. For example, the second encoding complexity measure calculator 129 may count the amounts (for example, the number of bits) of the encoded data, substitute the counted values into Equations (1) to (3), and calculate the $GCM_{60p}$. $X_t$, $X_p$, and $X_b$ obtained in Equations (1) to (3) may be collectively treated as the $GCM_{60p}$.

The second encoding complexity measure calculator 129 stores Equations (1) to (3) in an internal memory, reads Equations (1) to (3) in a process, substitutes the data amounts and average quantization parameters into Equations (1) to (3), and calculates the $GCM_{60p}$. In this case, the second encoding complexity measure calculator 129 may receive quantization parameters from the orthogonal transformer and quantizer 122 and calculate the average quantization parameters by calculating the averages of the quantization parameters.

The second encoding complexity measure recorder 130 records the $GCM_{60p}$ output by the second encoding complexity measure calculator 129 in a memory or the like. The second encoding complexity measure recorder 130 is, for example, the memory. In this case, the second encoding complexity measure recorder 130 and the motion information recorder 128 may be the same memory or may be different memories.

The first video image encoder 160 includes a differential image generator 161, an orthogonal transformer and quantizer 162, an entropy encoder 163, an inverse orthogonal transformer and inverse quantizer 164, an adder 165, a decoded image generator 166, and a predicted image generator 167. The predicted image generator 167 includes an intra-predictor 1671 and an inter-predictor 1672.

The processing blocks 121 to 127 included in the second video image encoder 120 have functions that are the same as or nearly same as those of the processing blocks 161 to 167 included in the first video image encoder 160, except that video image data to be processed by the second video image encoder 120 is different from video image data to be processed by the first video image encoder 160. In the first embodiment, a description of the processing blocks 121 to 127 included in the second video image encoder 120 is omitted.

The orthogonal transformer and quantizer 162 may suppress amounts of data after encoding to amounts equal to or smaller than the target information amounts by changing the quantization step and the like based on, for example, the target information amounts output by the first encoding complexity measure calculator 150, thereby enabling the rate control.

The predicted image generator 167 (or the inter-predictor 1672) may generate a predicted image based on the target information amounts output by the first encoding complexity measure calculator 150.

The first encoding complexity measure calculator 150 outputs the target information amounts to the predicted image generator 167 and the orthogonal transformer and quantizer 162.

Method for Calculating Correction Coefficients r

Next, a method for calculating the correction coefficients r is described. The correction coefficient setting section 140 calculates the correction coefficients r based on, for example, distances between the pictures to be encoded and belonging to the TID=6 and pictures to be referenced in the time direction.

Figure 3:
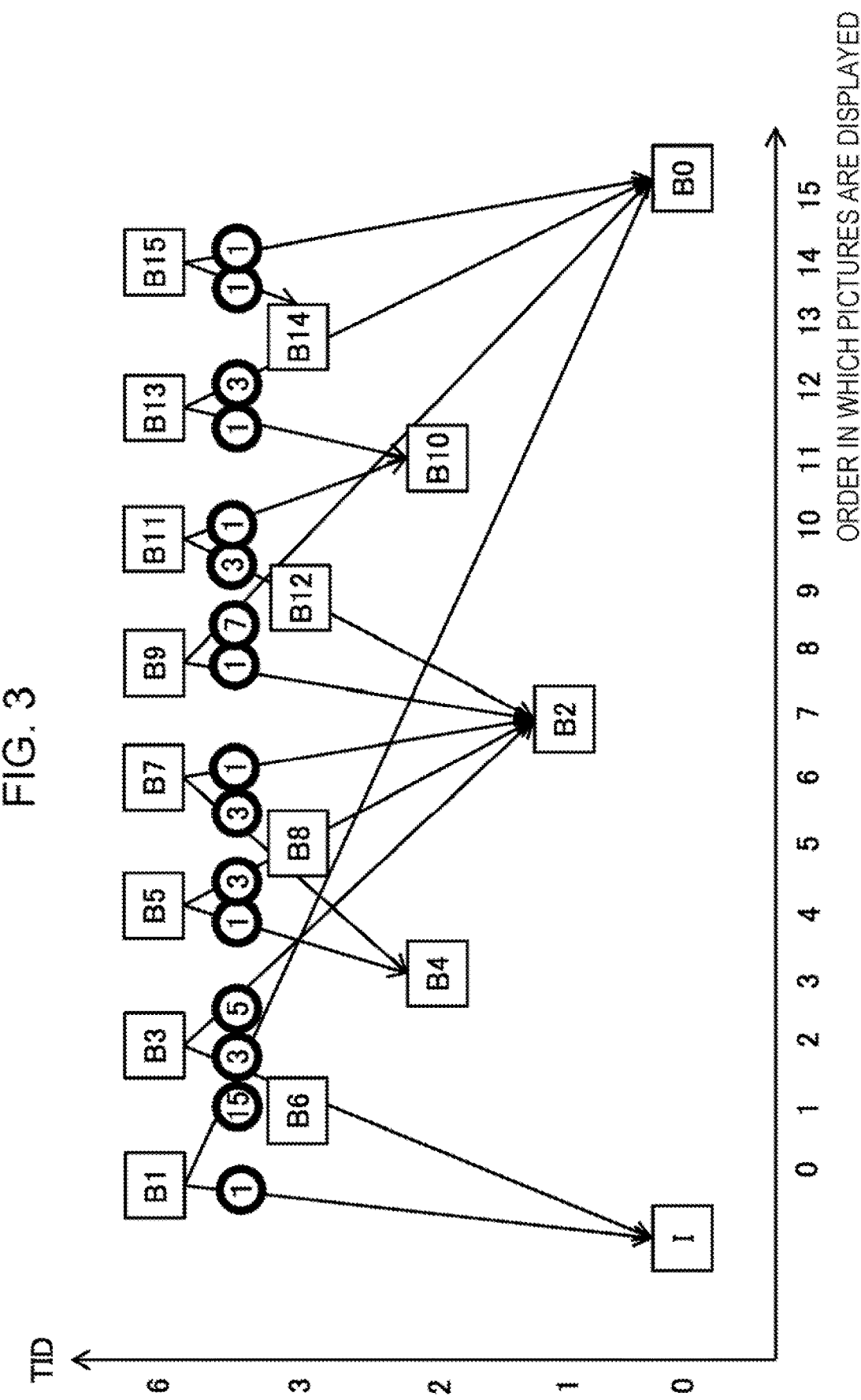
FIG. 3 is a diagram illustrating an example of an SOP.

FIG. 3 is a diagram illustrating an example of the distances between the pictures belonging to the TID=6 and the pictures to be referenced.

As illustrated in FIG. 3, when the "B1" picture is to be encoded by referencing the "I" picture, a distance between the "B1" picture and the "I" picture in the time direction is "1". When the "B1" picture is to be encoded by referencing the "B0" picture, a distance between the "B1" picture and the "B0" picture in the time direction is "15". When the "B1" picture is to be encoded by referencing the "I" picture, the distance between the "B1" picture and the "I" picture is shorter than the distance between the "B1" picture and the "B0" picture, and the correction coefficient setting section 140 sets a correction coefficient r to a value smaller than a value to be set when the "B0" picture is referenced. On the other hand, when the "B1" picture is to be encoded by referencing the "B0" picture, the correction coefficient setting section 140 sets the correction coefficient r to a value larger than a value to be set when the "I" picture is referenced. As a distance between a picture to be encoded and a picture to be referenced in the time direction is longer, the correction coefficient setting section 140 sets a correction coefficient r to a larger value. As the distance between the picture to be encoded and the picture to be referenced in the time direction is shorter, the correction coefficient setting section 140 sets the correction coefficient r to a smaller value. The correction coefficient r is, for example, a value proportional to the distance.

For example, the correction coefficient setting section 140 may set a correction coefficient r for each of the pictures to be encoded based on the minimum distance among distances between the picture to be encoded and pictures to be referenced in the time direction. For example, since the minimum distance among distances between the "B1" picture and the pictures to be referenced in the time direction is "1", and the minimum distance among distances between the "B3" picture and pictures to be referenced in the time direction is "3", the correction coefficient setting section 140 may set correction coefficients r for the "B1" and "B3" pictures so that the correction coefficient r for the "B1" picture is smaller than the correction coefficient r for the "B3" picture. For example, the correction coefficient setting section 140 sets a correction coefficient r for a picture to be encoded based on the minimum distance among distances between the picture to be encoded and pictures to be referenced in the time direction.

The correction coefficient setting section 140 may set a correction coefficient r for each of pictures to be encoded based on the maximum distance among distances between the picture to be encoded and pictures to be referenced in the time direction. For example, since the maximum distance among the distances between the "B1" picture and the pictures to be referenced in the time direction is "15" and the maximum distance among the distances between the "B3" picture and the pictures to be referenced in the time direction is "5", the correction coefficient setting section 140 may set the correction coefficients r for the "B1" and "B3" pictures so that the correction coefficient r for the "B1" picture is larger than the correction coefficient r for the "B3" picture. For example, the correction coefficient setting section 140 sets a correction coefficient r for a picture to be encoded based on the maximum distance among distances between the picture to be encoded and pictures to be referenced in the time direction.

The correction coefficient setting section 140 may set a correction coefficient for each of the pictures to be encoded based on an average of distances between the picture to be encoded and pictures to be referenced in the time direction. For example, since an average of distances between the "B1" picture and the pictures to be referenced in the time direction is "8", and an average of distances between the "B3" picture and the pictures to be referenced in the time direction is "4", the correction coefficient setting section 140 may set the correction coefficients r for the "B1" and "B3" pictures so that the correction coefficient r for the "B1" picture is larger than the correction coefficient r for the "B3" picture.

The correction coefficient setting section 140 may determine correction coefficients r based on a movement direction of a camera that outputs video image data of an input video image to the encoding device 100, for example.

For example, when the camera that outputs the input video image to the encoding device 100 is moved upward, the input video image appears to move from the upper side to the downward side. In this case, the pictures to be encoded may be encoded by referencing pictures preceding the pictures to be encoded in the time direction.

Thus, when the camera is moved upward, the correction coefficient setting section 140 sets the correction coefficient r for the "B1" picture using the "I" picture preceding the "B1" picture based on the distance "1" between the "B1" picture and the "I" picture in the time direction. Similarly, the correction coefficient setting section 140 may set correction coefficients r for the "B3" and "B5" pictures and the like based on a distance "3" between the "B3" picture and a picture to be referenced in the time direction, a distance "1" between the "B5" picture and a picture to be referenced in the time direction, and the like.

FIG. 4 is a diagram illustrating an example of distances between pictures in this case. In FIG. 4, "preceding distances" indicate distances between pictures to be encoded and pictures to be referenced and preceding the pictures to be encoded in the time direction. A preceding distance between the "B1" picture and the picture to be referenced in the time direction is "1", and a preceding distance between the "B3" picture and the picture to be referenced in the time direction is "3".

For example, when the camera is moved rightward, the input video image appears to move from the right side to the leftward side. In this case, the pictures are to be encoded by referencing pictures preceding the pictures to be encoded, and distances between the pictures to be encoded and the pictures to be referenced in the time direction may be the "preceding distances" illustrated in FIG. 4, for example.

When the camera is moved downward, the input video image appears to move from the lower side to the upward side. In this case, the pictures to be encoded may be encoded by referencing pictures succeeding the pictures to be encoded.

In this case, as indicated by "succeeding distances" illustrated in FIG. 4, a succeeding distance between the "B1" picture and the picture to be referenced in the time direction is "15", and a succeeding distance between the "B3" picture and a picture to be referenced in the time direction is "5". The correction coefficient setting section 140 sets the correction coefficients r based on the distances. The same applies the case where the camera is moved leftward.

In this manner, the correction coefficient setting section 140 may determine, based on a movement direction of the camera, pictures to be referenced and preceding the pictures to be encoded or pictures to be referenced and succeeding the pictures to be encoded and calculate the correction coefficients r based on distances between the pictures to be encoded and pictures to be referenced and preceding or succeeding the pictures to be encoded in the time direction.

The correction coefficient setting section 140 may determine a movement direction of the camera based on a motion vector of an encoded picture.

For example, as the motion vector, an average value of motion vectors of all pictures may be calculated or an average value of motion vectors of all the pictures belonging to the TID=6 may be calculated. As the average value, an average value of motion vectors in a previous SOP or an average value of motion vectors in multiple SOPs from an nth (n=an integer of 2 or more) previous SOP to the previous SOP may be calculated. For example, the predicted image generator 127 causes information on a motion vector to be stored in the motion information recorder 128 for each time of the generation of a predicted image. Thus, information of motion vectors of the multiple SOPs from the nth previous SOP to the previous SOP is stored in the motion information recorder 128. Thus, the correction coefficient setting section 140 may read the information of the motion vectors of the multiple SOPs from the nth previous SOP to the previous SOP from the motion information recorder 128, calculate an average value of the motion vectors, read information of the motion vectors of all the pictures belonging to the TID=6, and calculate the average value of the motion vectors. In the aforementioned example, information on motion vectors used in the generation of a predicted image of the 4K 60 p video image data is stored in the motion information recorder 128. For example, the correction coefficient setting section 140 may calculate the correction coefficients r using motion vectors used in the generation of an 8K 120 p predicted image in the predicted image generator 167 of the first video image encoder 160, for example. In this case, the correction coefficient setting section 140 stores information on the motion vectors generated by the inter-predictor 1672 of the predicted image generator 167 in an internal memory or the like. Thus, the information on the motion vectors of the multiple SOPs from the nth previous SOP to the previous SOP may be stored in the internal memory. The correction coefficient setting section 140 may read the information on the motion vectors from the internal memory and calculate an average of the motion vectors of the multiple SOPs from the nth previous SOP to the previous SOP.

Alternatively, the correction coefficient setting section 140 may estimate a movement direction of the camera from a motion vector of a 4K 60 p picture ("B2" picture) belonging to the TID=1. As illustrated in FIG. 3, the "B2" picture is placed at the center within the SOP and a movement direction of an entire screen may be estimated by referencing the I picture or the "B0" picture upon the encoding of the "B2" picture.

Alternatively, the correction coefficient setting section 140 may estimate a movement direction of the camera based on motion vectors of four B pictures ("B6", "B8", "B12", and "B14" pictures) belonging to the TID=3. For example, the correction coefficient setting section 140 may calculate an average of motion vectors of the four B pictures belonging to the TID=3 and estimate the movement direction of the camera based on the calculated average.

The example describes the case where when the camera is moved upward or rightward, preceding pictures are referenced, and when the camera is moved downward or leftward, succeeding pictures are referenced. For example, when the camera is moved upward or rightward, the succeeding pictures may be referenced and the correction coefficient setting section 140 may determine the distances (succeeding distances illustrated in FIG. 4) in the time direction between the pictures to be encoded and the pictures to be referenced and succeeding the pictures to be encoded. For example, when the camera is moved downward or leftward, the preceding pictures may be referenced and the correction coefficient setting section 140 may determine distances (preceding distances illustrated in FIG. 4) in the time direction between the pictures to be encoded and the pictures to be referenced and preceding the pictures to be encoded.

FIG. 5A is a diagram illustrating a specific example of correction coefficients r in the case where the correction coefficients r are set based on minimum distances. As illustrated in FIG. 5A, since the minimum distance among distances between the "B1" picture and the pictures to be referenced in the time direction is "1", the correction coefficient setting section 140 sets the correction coefficient r for the "B1" picture to "1" based on the distance. Since the minimum distance among distances between the "B3" picture and the pictures to be referenced in the time direction is "3", the correction coefficient setting section sets the correction coefficient r for the "B3" picture to "3" based on the distance.

FIG. 5B is a diagram illustrating a specific example of correction coefficients r in the case where the correction coefficients r are set based on amounts of information actually generated upon the encoding.

For example, since the amount of information actually generated upon the encoding of the "B1" picture in the previous SOP is "57 kbits", the correction coefficient setting section 140 sets the correction coefficient r for the "B1" picture of the current SOP to "3" based on the amount of the actually generated information. For example, since the amount of information actually generated upon the encoding of the "B3" picture in the previous SOP is "549 kbits", the correction coefficient setting section 140 sets the correction coefficient r for the "B3" picture of the current SOP to "25" based on the amount of the actually generated information. The correction coefficient setting section 140 sets correction coefficients r for the other pictures based on amounts of information actually generated upon the encoding of the pictures in the previous SOP. For example, when the scalable coding is executed in units of SOPs, the correction coefficient setting section 140 may calculate the correction coefficients r based on amounts of information generated in pictures placed at the same positions in the previous SOP as the pictures to be encoded in the time direction of the pictures to be encoded.

Figure 6:
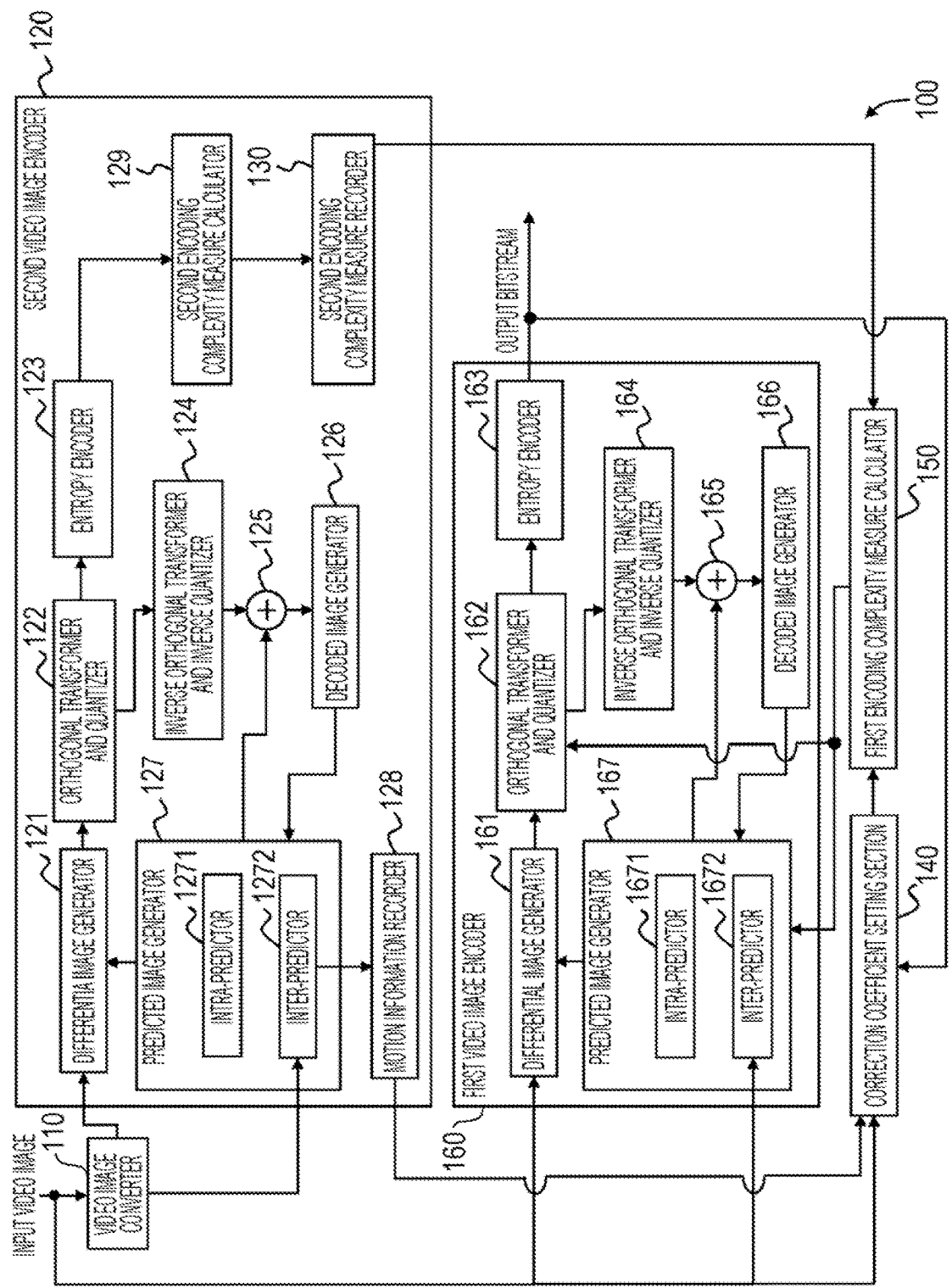
FIG. 6 is a diagram illustrating an example of the configuration of the encoding device.

FIG. 6 is a diagram illustrating an example of a configuration of the encoding device 100 in the aforementioned case. The entropy encoder 163 outputs encoded data of the pictures to the correction coefficient setting section 140. The correction coefficient setting section 140 calculates amounts of information actually generated upon the encoding of the pictures by counting the encoded data of the pictures or the like. Then, for example, the correction coefficient setting section 140 holds the actually generated information in the internal memory or the like, reads the actually generated information from the internal memory upon the setting of the correction coefficients r for the pictures of the current SOP, and sets the correction coefficients r based on the amounts of the actually generated information. For example, the correction coefficient setting section 140 calculates the correction coefficients r based on the amounts of the information generated upon the encoding of the pictures to be encoded.

In the example illustrated in FIG. 5B, pictures corresponding to the previous SOP are used. For example, the correction coefficient setting section 140 may set the correction coefficients r based on an average value of amounts of information actually generated upon the encoding of pictures included in the SOPs from the nth previous SOP to the previous SOP. For example, the correction coefficient setting section 140 may calculate the correction coefficients r based on an average value of amounts of information generated in pictures placed at the same positions in the nth previous SOP as the pictures to be encoded in the time direction of the pictures to be encoded.

As described above, the amounts of information generated upon the encoding of the pictures are proportional to the distances between the pictures to be encoded and pictures to be referenced in the time direction. Thus, as a distance between a picture to be encoded and a picture to be referenced in the time direction is longer, the amount of information actually generated upon the encoding of the picture is larger. As the distance between the picture to be encoded and the picture to be referenced in the time direction is shorter, the amount of information actually generated upon the encoding of the picture is smaller. Setting a correction coefficient based on the distance may be considered to have the same meaning as setting the correction coefficient based on the amount of generated information.

Method for Setting $GCM_{120p}$

The first encoding complexity measure calculator 150 calculates the $GCM_{120p}$ (8K 120 p GCM) based on the correction coefficients r and the $GCM_{60p}$ (4K 60 p GCM) read from the second encoding complexity measure recorder 130. The first encoding complexity measure calculator 150 calculates the $GCM_{120p}$ using the following equations.

As GCMs of the pictures belonging to the TIDs=0 to 3, 4K 60 p GCMs are used. As GCMs of pictures belonging to the TID=6, 4K 60 p GCMs are scaled and used.

$$GCM\_120p\ (TID0 \sim TID3) = GCM\_60p\ (TID0 \sim TID3) \quad (4\text{-}1)$$

$$GCM_{120p} = GCM_{60p} * \frac{GCM\_RATIO[PIC\_TID3]}{GCM\_RATIO[PIC\_TID6]} * r \quad (4)$$

In Equation (4), GCM_RATIO[PIC_TID6] and GCM_RATIO[PIC_TID3] are fixed values indicating ratios of a GCM of the I picture to GCMs of the pictures belonging to the TIDs=6 and 3 and may be set in advance. For example, when GCM_RATIO[PIC_TID6] is "24" and GCM_RATIO[PIC_TID3] is "20", each of the GCMs of the pictures belonging to the TID=6 is 1/24 of the GCM of the I picture, and each of the GCMs of the pictures belonging to the TID=3 is 1/20 of the GCM of the I picture. Thus, GCM_RATIO[PIC_TID6]/GCM_RATIO[PIC_TID3] is 20/24. GCM_RATIO[PIC_TID6]/GCM_RATIO[PIC_TID3] indicates that the amount of information generated upon the encoding of the pictures (or all pictures) belonging to the TID=6 is 20/24 of the amount of information generated upon the encoding of the pictures (or all pictures) belonging to the TID=3.

The first encoding complexity measure calculator 150 may calculate the $GCM_{120p}$ using the following equation.

$$GCM_{120p} = GCM_{60p} * \frac{GCM\_RATIO[PIC\_TID3]}{GCM\_RATIO[PIC\_TID6]} \quad (5)$$

In Equations (4) and (5), the $GCM_{120p}$ is calculated based on the $GCM_{60p}$.

As described above, regarding the pictures belonging to the TIDs=0 to 3, distances between pictures of the same TID and pictures to be referenced in the time direction are the same, and the $GCM_{60p}$ may be in a fixed range. GCM_RATIO[PIC_TID3]/GCM_RATIO[PIC_TID6] is a fixed value. Thus, when the $GCM_{120p}$ is calculated using Equation (5), the $GCM_{120p}$ is in a fixed range.

As described above, however, a distance between a picture belonging to the TID=6 and a picture to be referenced in the time direction may be significantly different from a distance between another picture belonging to the TID=6 and a picture to be referenced in the time direction, and amounts of information generated upon the encoding of the pictures belonging to the TID=6 may not be in a fixed range.

In the first embodiment, the first encoding complexity measure calculator 150 corrects the $GCM_{120p}$ estimated for each of the pictures belonging to the TID=6 based on a distance between the picture to be encoded and a picture to be referenced in the time direction. For example, the first encoding complexity measure calculator 150 calculates the $GCM_{120p}$ using the correction coefficients r set by the correction coefficient setting section 140.

Thus, for example, the $GCM_{120p}$ is not in a fixed range and is corrected based on distances between the pictures to be encoded and pictures to be referenced in the time direction. As described above, since amounts of information generated upon the encoding of the pictures to be encoded are proportional to distances between the pictures to be encoded and pictures to be referenced in the time direction, the $GCM_{120p}$ is corrected based on the distances using the correction coefficients r varying depending on the distances. Thus, the $GCM_{120p}$ varies depending on the amounts of information generated upon the encoding of the pictures to be encoded and belonging to the TID=6.

When Equation (4) is used, the $GCM_{120p}$ is corrected based on the amounts of information generated upon the encoding of the pictures to be encoded. Thus, the encoding device 100 may improve the accuracy of estimating the $GCM_{120p}$, compared with the case where Equation (5) is used.

When the accuracy of estimating the $GCM_{120p}$ of the pictures belonging to the TID=6 is improved, the target information amounts are set based on the $GCM_{120p}$, and the rate control is executed based on the target information amounts, the amounts of generated information may be suppressed to amounts smaller than the target information amounts. Thus, the encoding device 100 may appropriately execute the rate control and suppress a reduction, caused by inappropriate execution of the rate control, in the quality of an image.

The first encoding complexity measure calculator 150 may hold Equation (4) in, for example, an internal memory, read Equation (4) from the internal memory in a process, substitute the correction coefficients r and the $GCM_{60p}$ into Equation (4), and obtain the corrected $GCM_{120p}$.

Figure 7:
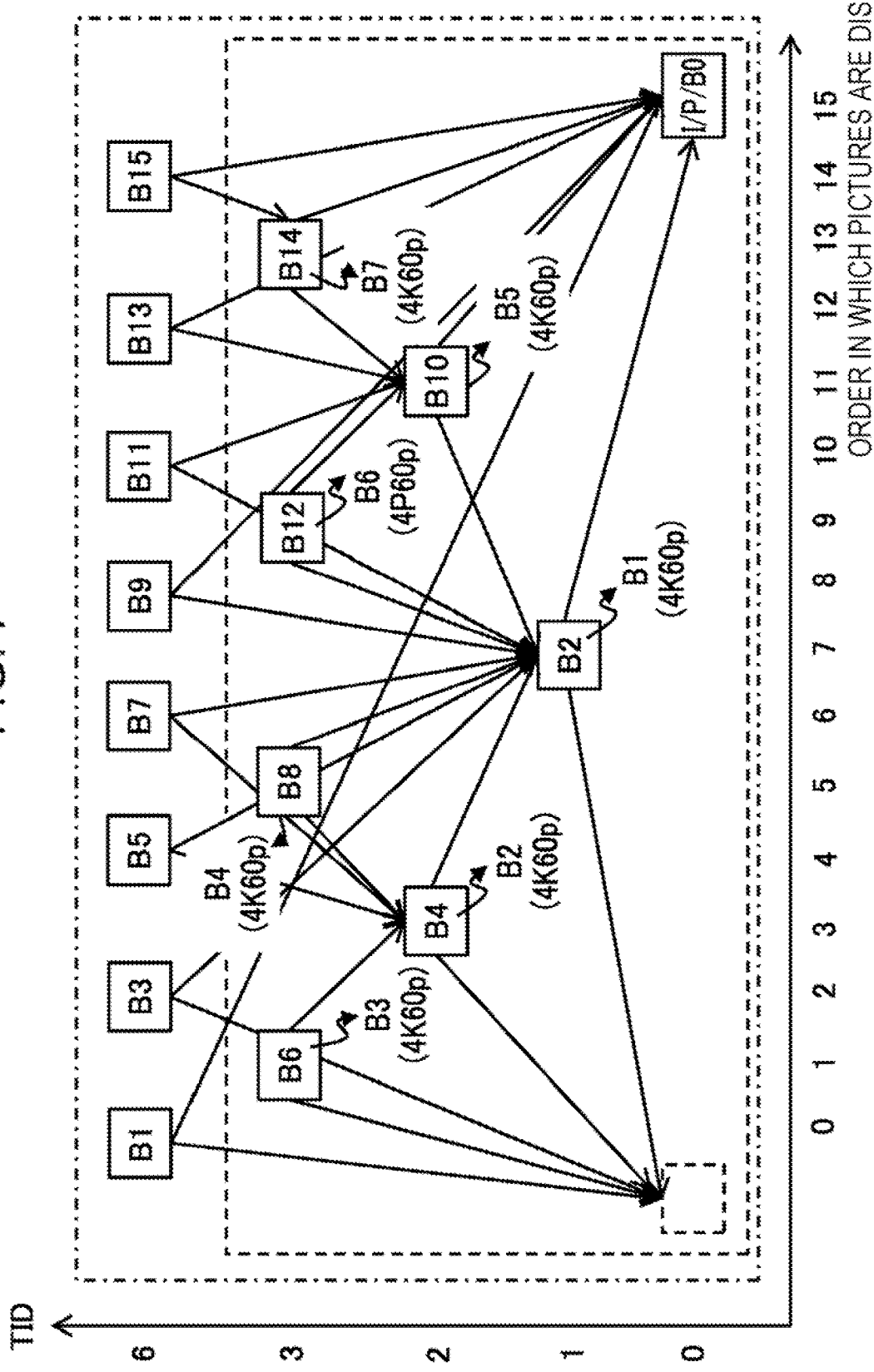
FIG. 7 is a diagram illustrating the order in which 4K 60 p pictures are encoded.
Figure 8:
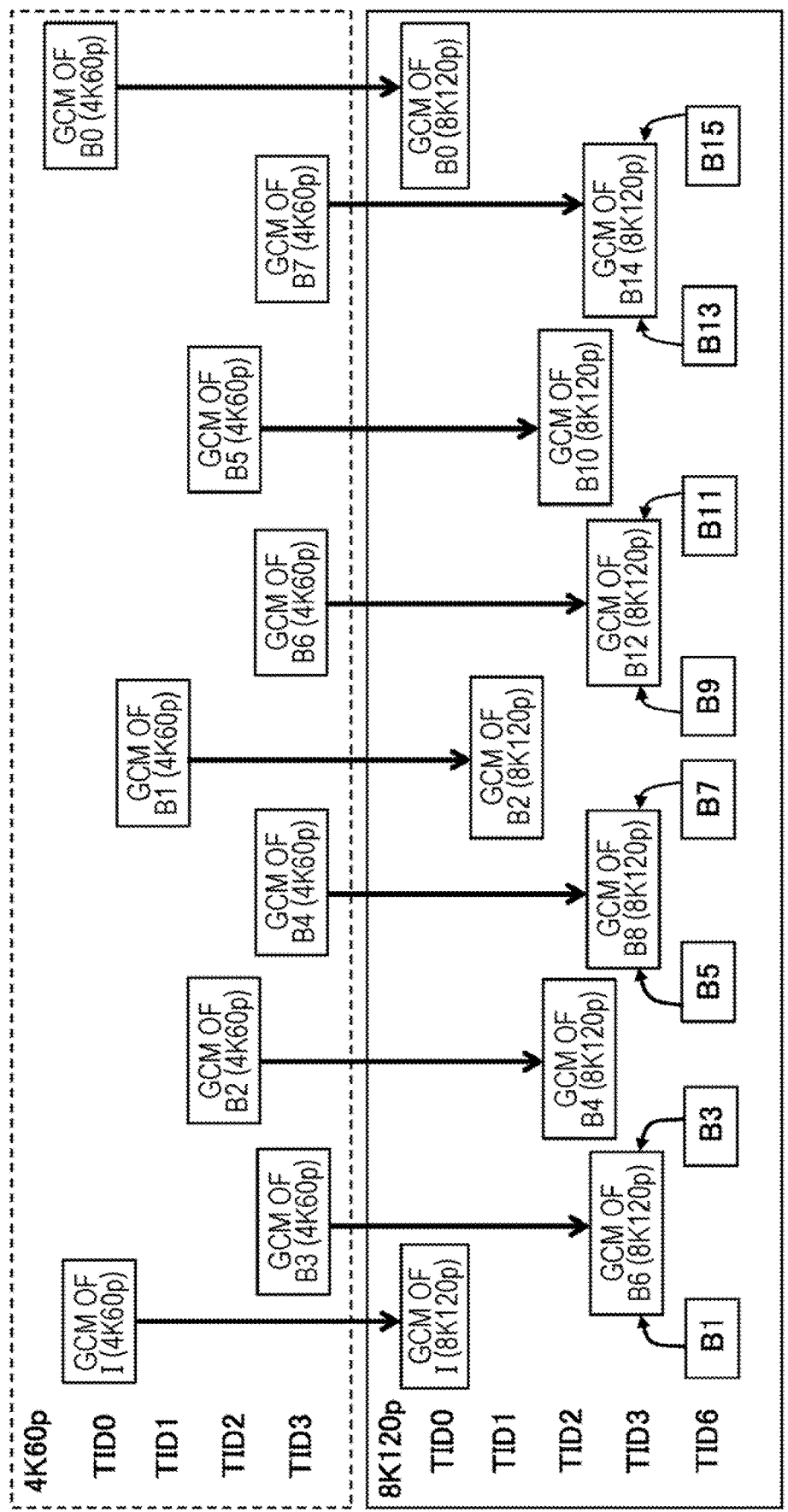
FIG. 8 is a diagram illustrating an example of pictures to be referenced upon the calculation of GCMs.

FIGS. 7 and 8 are diagrams illustrating examples in which $GCM_{60p}$ of pictures to be referenced for the encoding of the pictures belonging to the TIDs=0 to 3 is used to calculate the $GCM_{120p}$ in the case where the first encoding complexity measure calculator 150 uses Equation (4) to determine the $GCM_{120p}$.

As illustrated in FIG. 8, for example, $GCM_{120p}$ of the "B1" picture belonging to the TID=6 is calculated by substituting $GCM_{60p}$ of the 4K 60 p "B6" picture into Equation (4). Similarly, $GCM_{120p}$ of the "B3" picture belonging to the TID=6 is calculated by substituting $GCM_{60p}$ of the 4K 60 p "B6" picture into Equation (4). FIG. 8 illustrates correspondence relationships between 8K 120 p pictures and 4K 60 p pictures to be used to estimate $GCM_{120p}$ of the 8K 120 p pictures and indicates pictures corresponding to $GCM_{60p}$ of the 4K 60 p pictures and to be substituted into the right side of Equation (4).

The correspondence relationships illustrated in FIG. 8 are illustrated in FIG. 7.

For example, in FIG. 8, the 4K 60 p pictures (I and B0 to B7 pictures) belonging to the TIDs=0 to 3 are data to be encoded and belonging to a second layer. For example, in FIG. 8, 8K 120 p pictures belonging to the TIDs=0 to 6 are data to be encoded and belonging to a first layer.

Method for Setting Target Information Amount

In the first embodiment, the encoding device 100 determines a target information amount for each of pictures and executes the rate control to enable the target information amounts. As the target information amounts, target information amounts for types of pictures defined in step 1 of TM5 are used.

For example, the encoding device 100 calculates a target information amount $T_i$ for the I picture using the following Equation (6).

$$T_i = R/(1 + N_p \times (S_p/S_i) + N_b \times (S_p/S_i)) \quad (6)$$
$$= R/(1 + N_p(X_p/X_iK_p)) + N_b(X_b/X_iK_b))$$

In Equation (6), R indicates the amount of information of remaining pictures that are not encoded in an GOP, $N_p$ indicates the number of P pictures in the GOP, and $N_b$ indicates the number of B pictures in the GOP. In addition, $S_i$, $S_p$, and $S_b$ indicate amounts of information generated upon the encoding of the I, P, and B pictures. $K_p$ and $K_b$ indicate fixed values depending on a quantization matrix.

Equation (6) indicates that the amount of information allocated to an unprocessed picture within the GOP is calculated as a target information amount from the amount R of the information of the remaining pictures in the GOP and encoding complexity measures $X_i$, $X_p$, and $X_b$ of encoded pictures. In other words, Equation (6) indicates the amount of information allocated to the single I picture as a target information amount in the case where the amount of information generated upon each of P and B pictures is calculated to be "1" that is the number of I pictures.

When attention is paid to the right side of Equation (6), a target information amount $T_i$ of the I picture is calculated based on the number $N_p$ of P pictures within the GOP, the number $N_b$ of B pictures within the GOP, and the GCMs ($X_i$, $X_p$, and $X_b$).

Similarly, the encoding device 100 uses the following Equation (7) to calculate a target information amount $T_p$ for each of the P pictures and uses the following Equation (8) to calculate a target information amount $T_b$ for each of the B pictures.

$$T_p = R/(N_p + N_b \times (S_b/S_p)) = R/(N_p + N_b(K_pX_b/K_bX_p)) \quad (7)$$

$$T_b = R/(N_b + N_p \times (S_p/S_b)) = R/(N_b + N_p(K_bX_p/K_pX_b)) \quad (8)$$

As indicated by Equations (7) and (8), the target information amount $T_p$ for each of the P pictures and the target information amount $T_b$ for each of the B pictures are calculated based on the number $N_p$ of P pictures within the GOP, the number $N_b$ of B pictures within the GOP, and the GCMs ($X_p$ and $X_b$).

For example, the first encoding complexity measure calculator 150 executes the following process. For example, the first encoding complexity measure calculator 150 holds Equations (6) to (8) in the internal memory or the like and reads Equations (6) to (8) from the internal memory in a process. Then, the first encoding complexity measure calculator 150 substitutes the number $N_p$ of P pictures within the GOP, the number $N_b$ of B pictures within the GOP, and the GCMs ($GCM_{60p}$) obtained from Equations (1) to (3) into Equations (6) to (8) to obtain target information amounts $T_p$ and $T_b$ for the pictures belonging to the TIDs=0 to 3. In addition, the first encoding complexity measure calculator 150 substitutes the number $N_p$ of P pictures within the GOP, the number $N_b$ of B pictures within the GOP, and the GCMs ($GCM_{120p}$) obtained from Equation (4) into Equations (6) to (8) to obtain target information amounts $T_p$ and $T_b$ for the pictures belonging to the TID=6.

Example of Operations

Figure 9:
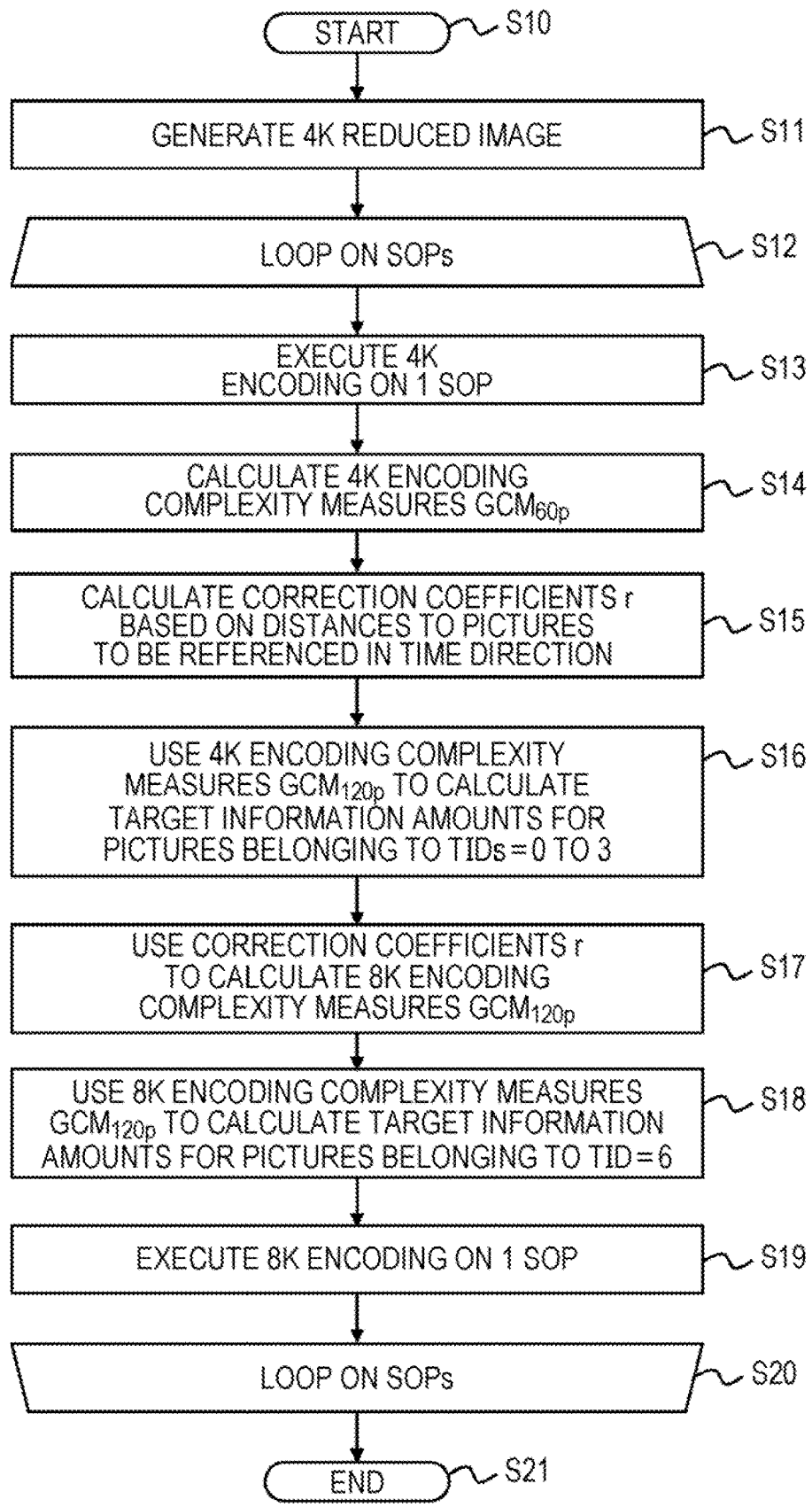
FIG. 9 is a flowchart of an example of operations.

FIG. 9 is a flowchart illustrating the example of the operations of the encoding device 100.

When the encoding device 100 starts to execute a process (in S10), the encoding device 100 generates a 4K reduced image (in S11). For example, the video image converter 110 converts 8K 120 p video image data to 4K 60 p video image data, thereby generating the 4K reduced image.

Next, the encoding device 100 repeats the following process in units of SOPs (in S12).

For example, the encoding device 100 executes 4K encoding on a single SOP (in S13). For example, the second video image encoder 120 executes temporal scalable coding on the 4K 60 p video image data.

Then, the encoding device 100 calculates 4K encoding complexity measures $GCM_{60p}$ (in S14). For example, the second encoding complexity measure calculator 129 substitutes amounts $S_i$, $S_p$, and $S_b$ of information generated upon the encoding of pictures and average quantization parameters $Q_i$, $Q_p$, and $Q_b$ into Equations (1) to (3), thereby calculating $GCM_{60p}$ ($X_i$, $X_p$, and $X_b$) of the pictures.

Then, the encoding device 100 calculates correction coefficients r based on distances between the pictures to be encoded and pictures to be referenced in the time direction (in S15). For example, the correction coefficient setting section 140 executes the following process.

For example, the correction coefficient setting section 140 acquires 16 8K 120 p frames and allocates, based on SOP reference relationships (refer to FIG. 12), the frames to the target pictures in the order in which the pictures are to be encoded. For example, the correction coefficient setting section 140 treats an initial 8K 120 p frame as a "B1" picture, treats a second 8K 120 p frame as a "B6" picture, and executes this process on the 16 frames. Then, the correction coefficient setting section 140 determines correction coefficients r based on the SOP reference relationships and the distances between the pictures to be encoded and the pictures to be referenced in the time direction. The SOP reference relationships (refer to, for example, FIG. 12) are held in the internal memory of the correction coefficient setting section 140, for example. Then, the correction coefficient setting section 140 reads the SOP reference relationships from the internal memory in the process of S15 and acquires the distances between the pictures to be encoded and the pictures to be referenced in the time direction. In this case, the correction coefficient setting section 140 may determine the correction coefficients r based on motion information read from the motion information recorder 128 or may determine the correction coefficients r based on amounts, acquired from the entropy encoder 163, of actually generated information.

Then, the encoding device 100 uses the 4K encoding complexity measures $GCM_{60p}$ to calculate target information amounts $T_i$, $T_p$, and $T_b$ for pictures belonging to the TIDs=0 to 3 (in S16). For example, the first encoding complexity measure calculator 150 substitutes $GCM_{60p}$ ($X_i$, $X_p$, and $X_b$) of the pictures into Equations (6) to (8), thereby calculating the target information amounts $T_i$, $T_p$, and $T_b$ for the pictures belonging to the TIDs=0 to 3.

Then, the encoding device 100 uses the correction coefficients r to calculate 8K encoding complexity measures $GCM_{120p}$ (in S17). For example, the first encoding complexity measure calculator 150 substitutes the 4K encoding complexity measures $GCM_{60p}$ calculated in S14 and the correction coefficients r calculated in S15 into Equation (4), thereby calculating the $GCM_{120p}$. In this case, since a 4K encoding complexity measure $GCM_{60p}$ is calculated for each of the pictures, the first encoding complexity measure calculator 150 calculates an 8K encoding complexity measure $GCM_{120p}$ for each of the pictures.

Then, the encoding device 100 uses the 8K encoding complexity measures $GCM_{120p}$ to calculate target information amounts for pictures belonging to the TID=6 (in S18). For example, the first encoding complexity measure calculator 150 uses Equations (7) to (8) to calculate the target information amounts $T_p$, and $T_b$ for the types of the pictures belonging to the TID=6.

Then, the encoding device 100 executes 8K encoding on the single SOP (in S19). For example, the encoding device 100 executes the following process.

For example, the first encoding complexity measure calculator 150 outputs the target information amounts $T_i$, $T_p$, and $T_b$ for the pictures belonging to the TIDs=0 to 3 and the target information amounts $T_p$ and $T_b$ for the pictures belonging to the TID=6 to the orthogonal transformer and quantizer 162 and the predicted image generator 167. Then, the orthogonal transformer and quantizer 162 and the predicted image generator 167 execute a quantization process based on quantization values corresponding to the target information amounts $T_i$, $T_p$, and $T_b$ and generate predicted images based on the target information amounts $T_i$, $T_p$, and $T_b$.

Then, when a frame belonging to a next. SOP exists, the encoding device 100 causes the process to S12 and executes the processes of S13 to S19 (in S20).

When the frame belonging to the next SOP does not exist, the encoding device 100 terminates the process (in S21).

Other Embodiments

Figure 10:
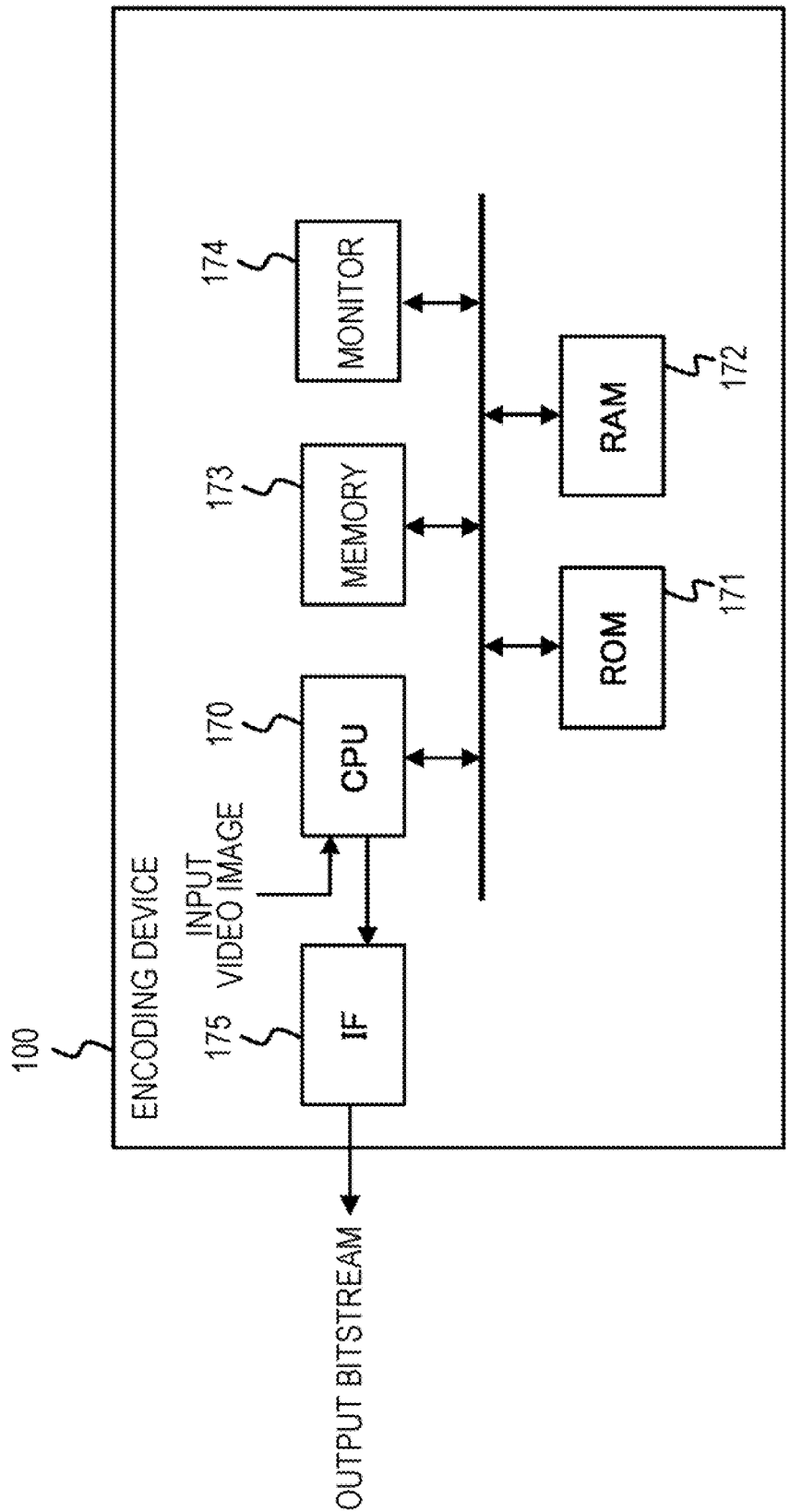
FIG. 10 is a diagram illustrating an example of a hardware configuration of the encoding device.

FIG. 10 is a diagram illustrating an example of a hardware configuration of the encoding device 100.

The encoding device 100 includes a central processing unit (CPU) 170, a read only memory (ROM) 171, a random access memory (RAM) 172, a memory 173, a monitor 174, and an interface (IF) 175. The CPU 170 is, for example, a single-core processor, a dual-core processor, or a multicore processor.

The CPU 170 reads a program stored in the ROM 171, loads the program into the RAM 172, and executes the loaded program. By executing the program, the CPU 170 executes the functions of the video image converter 110, the second video image encoder 120, the correction coefficient setting section 140, the first encoding complexity measure calculator 150, and the first video image encoder 160. The CPU 170 corresponds to the video image converter 110, the second video image encoder 120, the correction coefficient setting section 140, the first encoding complexity measure calculator 150, and the first video image encoder 160, for example.

The IF 175 converts a bitstream received from the CPU 170 to a bitstream transmittable to the decoding device and transmits the bitstream after the conversion to the decoding device.

The memory 173 stores Equations (1) to (4) and (6) to (8), for example. The monitor 174 displays, for example, an 8K 120 p input video image and a 4K 60 p image after image conversion.

A controller or a processor such as a micro processing unit (MPU), a digital signal processor (DSP), a graphics processing unit (GPU), a field programmable gate array (FPGA) may be used instead of the CPU 170. Each of the CPU, the MPU, the DSP, the GPU, and the FPGA may be called a processor.

Figure 11:
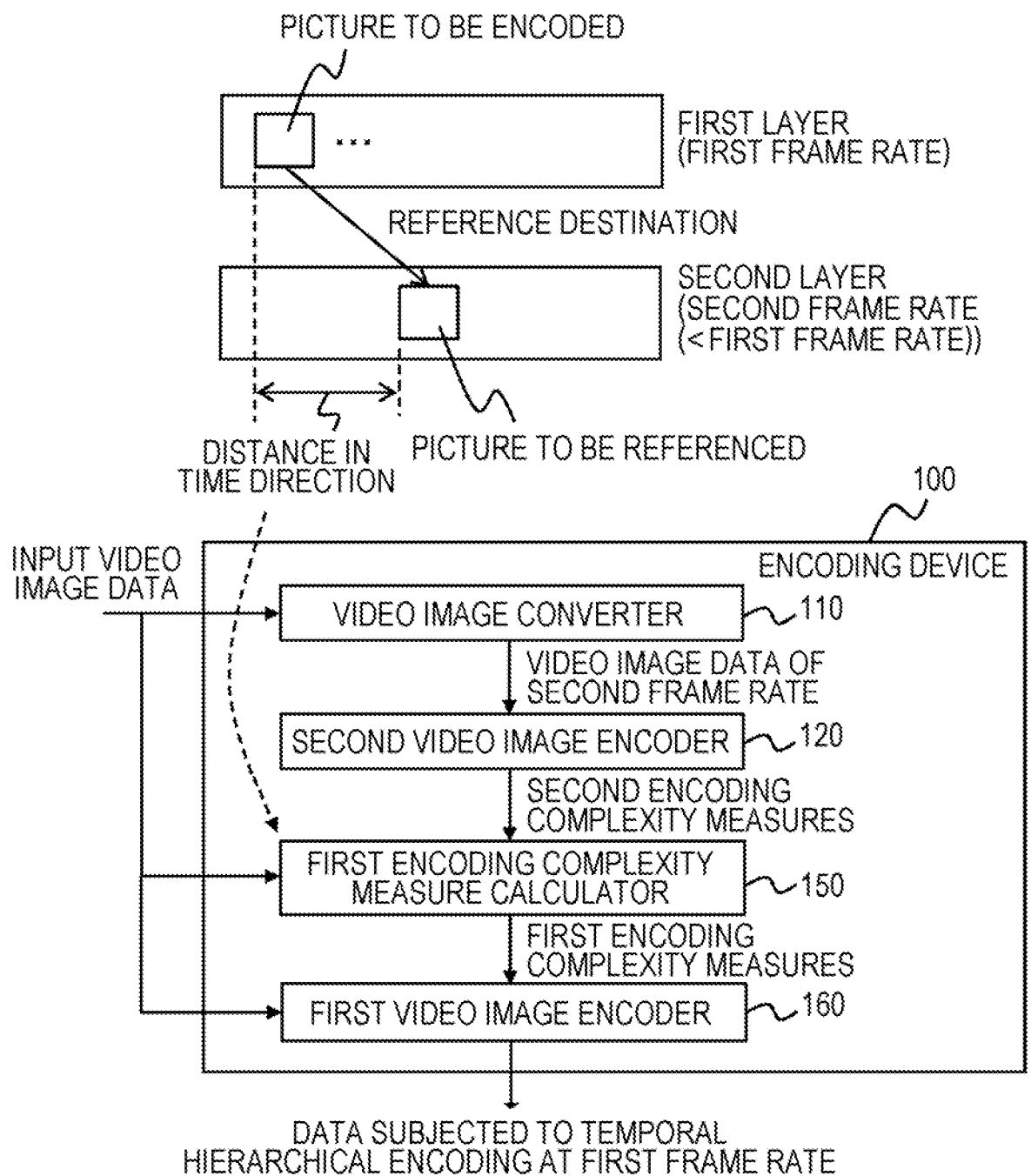
FIG. 11 is a diagram illustrating an example of the configuration of the encoding device.

FIG. 11 is a diagram illustrating another example of the configuration of the encoding device 100.

The encoding device 100 includes the video image converter 110, the second video image encoder 120, the first encoding complexity measure calculator 150, and the first video image encoder 160.

The encoding device 100 executes temporal scalable coding on input video image data at a first frame rate.

The video image converter 110 converts the input video image data to video image data of a second frame rate lower than the first frame rate.

The second video image encoder 120 executes temporal scalable coding on the video image data of the second frame rate and outputs second encoding complexity measures of pictures subjected to the temporal scalable coding at the second frame rate and belonging to a second layer.

The first encoding complexity measure calculator 150 corrects first encoding complexity measures, estimated based on second encoding complexity measures of pictures to be referenced and belonging to the second layer, of pictures to be encoded, based on distances between the pictures to be encoded and the pictures to be referenced in the time direction. The pictures to be referenced and belonging to the second layer are to be referenced for the pictures to be encoded and belonging to a first layer in the case where the temporal scalable coding is executed on the input video image data at the first frame rate.

The first video image encoder 160 executes the temporal scalable coding on the input video image at the first frame rate based on the corrected first encoding complexity measures.

The encoding device 100 illustrated in FIG. 11 corrects the first encoding complexity measures based on the distances between the pictures to be encoded and the pictures to be referenced in the time direction. Thus, the encoding device 100 calculates the first encoding complexity measures that correspond to differences between the pictures to be encoded and the pictures to be referenced and are based on amounts of information generated upon the encoding of the pictures to be encoded. Thus, when the encoding device 100 executes the rate control based on the first encoding complexity measures, the encoding device 100 may suppress the amounts of generated information to amounts equal to or smaller than the target information amounts.

Thus, the encoding device 100 may improve the accuracy of estimating the first encoding complexity measures, compared with the case where first encoding complexity measures of pictures belonging to the layer are in a fixed range. Since the amounts of generated information are suppressed to amounts equal to or smaller than the target information amounts, the encoding device 100 may appropriately execute the rate control and suppress a reduction in the quality of an image, compared with the aforementioned case.

The example is described using HEVC as an example. For example, as long as video image data is encoded in a hierarchical encoding scheme in a time axis direction, a method other than HEVC may be used. As the other method, H.264/MPEG-4 Advanced Video Coding (AVC) may be used.

The example describes the case where 2 pictures to be referenced exist for each of the pictures to be encoded, as illustrated in FIG. 3. 3 or more pictures to be referenced, however, may exist for each of the pictures to be encoded. In this case, the correction coefficient setting section 140 may calculate the correction coefficients r based on the minimum or maximum distance among distances between each of the pictures to be encoded and 3 or more pictures to be referenced in the time direction. When 1 picture to be referenced exists for each of the pictures to be encoded, the correction coefficient setting section 140 may calculate the correction coefficients r based on a distance between each of the pictures to be encoded and a picture to be referenced in the time direction.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding device, comprising:
a processor configured to:
execute temporal scalable coding on input video image data at a first frame rate;
convert the input video image data to video image data of a second frame rate lower than the first frame rate;
execute temporal scalable coding on the video image data of the second frame rate and output a second encoding complexity measure of a picture subjected to the temporal scalable coding at the second frame rate;
correct, when the temporal scalable coding is executed on the input video image data at the first frame rate, a first encoding complexity measure, estimated based on the second encoding complexity of the picture and to be referenced for a picture to be encoded, of the picture to be encoded, based on a distance between the picture to be encoded and the picture to be referenced in a time direction;
execute the temporal scalable coding on the input video image data at the first frame rate based on the corrected first encoding complexity measure;
calculate a correction coefficient based on the distance between the picture to be encoded and the picture to be referenced in the time direction;

calculate the first encoding complexity measure based on the second encoding complexity measure and the correction coefficient; and calculate the correction coefficient based on a movement direction of a camera that outputs the video image data to the encoding device, when the camera is moved upward or rightward, calculate the correction coefficient based on a distance between the picture to be encoded and a picture that is among pictures to be referenced and precedes the picture to be encoded in the time direction.

2. The encoding device according to claim 1, wherein the correction coefficient is proportional to the distance.

3. The encoding device according to claim 1, wherein the processor is configured to calculate the correction coefficient based on a minimum distance among distances between the picture to be encoded and multiple pictures to be referenced in the time direction.

4. The encoding device according to claim 1, wherein the processor is configured to calculate the correction coefficient based on a maximum distance among distances between the picture to be encoded and multiple pictures to be referenced in the time direction.

5. The encoding device according to claim 1, wherein the processor is configured to calculate the correction coefficient based on an amount of information generated upon an encoding of the picture to be encoded, and calculate the first encoding complexity measure based on the second encoding complexity measure and the correction coefficient.

6. The encoding device according to claim 5, wherein the correction coefficient is proportional to an amount of the generated information.

7. The encoding device according to claim 5, wherein when scalable coding is executed in units of structures of pictures (SOPs), the processor is configured to calculate the correction coefficient based on the amount of information generated in a picture placed at the same position in a previous SOP as the picture to be encoded.

8. The encoding device according to claim 5, wherein the processor is configured to calculate the correction coefficient based on an average value of amounts of information generated in a picture placed at the same position in an nth previous SOP as the picture to be encoded, where n is an integer of 2 or more.

9. The encoding device according to claim 1, wherein when the camera is moved downward or leftward, the processor is configured to calculate the correction coefficient based on a distance in the time direction between the picture to be encoded and a picture that is among the pictures to be referenced and succeeds the picture to be encoded.

10. The encoding device according to claim 9, wherein the processor is configured to determine a movement direction of the camera based on a motion vector generated in scalable coding.

11. The encoding device according to claim 1, wherein the processor is configured to determine a movement direction of the camera based on a motion vector generated in hierarchical encoding.

12. The encoding device according to claim 1, wherein when the scalable coding is executed on in units of SOPs, the processor is configured to determine a movement direction of the camera based on a motion vector of a picture encoded and included in a previous SOP in the time direction of the picture to be encoded, a motion vector of a picture belonging to a temporary identification (TID)=1 and included in the same SOP as the picture to be encoded, or a motion vector of a picture belonging to a TID=3 and included in the same SOP as the picture to be encoded.

13. The encoding device according to claim 1, wherein when the second encoding complexity measure is $GCM_{60p}$, GCM_RATIO[PIC_TID6] is "24", GCM_RATIO[PIC_TID3] is "20", and the correction coefficient is r, the processor is configured to calculate the first encoding complexity measure $GCM_{120p}$ by substitute the first encoding complexity measure $GCM_{120p}$ into an equation of $GCM_{120p}$=$GCM_{60p}$*GCM_RATIO[PIC_TID3]/GCM_RATIO[PIC_TID6]*r.

14. The encoding device according to claim 1, wherein the processor is configured to calculate the second encoding complexity measure based on an amount of information generated in the video image data subjected to the scalable coding.

15. An encoding method executed by a computer, comprising:

executing temporal scalable coding on input video image data at a first frame rate;

converting the input video image data to video image data of a second frame rate lower than the first frame rate;

executing temporal scalable coding on the video image data of the second frame rate and output a second encoding complexity measure of a picture subjected to the temporal scalable coding at the second frame rate;

correcting, when the temporal scalable coding is to be executed on the input video image data at the first frame rate, a first encoding complexity measure, estimated based on the second encoding complexity of the picture and to be referenced for a picture to be encoded, of the picture to be encoded, based on a distance between the picture to be encoded and the picture to be referenced in a time direction;

executing the temporal scalable coding on the input video image data at the first frame rate based on the corrected first encoding complexity measure;

calculating a correction coefficient based on the distance between the picture to be encoded and the picture to be referenced in the time direction;

calculating the first encoding complexity measure based on the second encoding complexity measure and the correction coefficient; and calculating the correction coefficient based on a movement direction of a camera that outputs the video image data to the encoding device, when the camera is moved upward or rightward, calculating the correction coefficient based on a distance between the picture to be encoded and a picture that is among pictures to be referenced and precedes the picture to be encoded in the time direction.

16. A non-transitory computer-readable recording medium storing therein a program for causing a computer to execute a process, the process comprising:

executing temporal scalable coding on input video image data at a first frame rate;

converting the input video image data to video image data of a second frame rate lower than the first frame rate;

executing temporal scalable coding on the video image data of the second frame rate and output a second encoding complexity measure of a picture subjected to the temporal scalable coding at the second frame rate;

correcting, when the temporal scalable coding is to be executed on the input video image data at the first frame rate, a first encoding complexity measure, estimated based on the second encoding complexity of the picture and to be referenced for a picture to be encoded, of the picture to be encoded, based on a distance between the picture to be encoded and the picture to be referenced in a time direction;
executing the temporal scalable coding on the input video image data at the first frame rate based on the corrected first encoding complexity measure;
calculating a correction coefficient based on the distance between the picture to be encoded and the picture to be referenced in the time direction;
calculating the first encoding complexity measure based on the second encoding complexity measure and the correction coefficient; and
calculating the correction coefficient based on a movement direction of a camera that outputs the video image data to the encoding device,
when the camera is moved upward or rightward, calculating the correction coefficient based on a distance between the picture to be encoded and a picture that is among pictures to be referenced and precedes the picture to be encoded in the time direction.

* * * * *